(12) United States Patent
Chen et al.

(10) Patent No.: US 12,411,334 B2
(45) Date of Patent: Sep. 9, 2025

(54) OPTICAL LENS ASSEMBLY AND HEAD-MOUNTED ELECTRONIC DEVICE

(71) Applicant: NEWMAX TECHNOLOGY CO., LTD., Taichung (TW)

(72) Inventors: Ping-Yi Chen, Taichung (TW); Fei-Hsin Tsai, Taichung (TW); Cong Ge, Guangdong Province (CN)

( * ) Notice: Subject to any disclaimer, the term of this patent is extended or adjusted under 35 U.S.C. 154(b) by 328 days.

(21) Appl. No.: 18/220,279

(22) Filed: Jul. 11, 2023

(65) Prior Publication Data
US 2024/0345380 A1    Oct. 17, 2024

(30) Foreign Application Priority Data
Apr. 13, 2023    (TW) ................................ 112113797

(51) Int. Cl.
   *G02B 25/00*      (2006.01)
   *G02B 27/01*      (2006.01)

(52) U.S. Cl.
   CPC ....... *G02B 25/001* (2013.01); *G02B 27/0172* (2013.01)

(58) Field of Classification Search
   CPC .......................... G02B 25/001; G02B 27/0172
   USPC ......................................... 359/630, 716, 784
   See application file for complete search history.

(56) References Cited

U.S. PATENT DOCUMENTS

2023/0400694 A1*   12/2023   Yamada ................ G02F 1/1335

* cited by examiner

*Primary Examiner* — William Choi
(74) *Attorney, Agent, or Firm* — Bruce Stone LLP; Joseph A. Bruce

(57) ABSTRACT

An optical lens assembly includes, an optical element group; and in order from a visual side to an image source side: a first lens with positive refractive power, a second lens with refractive power, a third lens with refractive power, and an image source-side surface of the third lens being convex in a paraxial region thereof, and a partial-reflective-partial-transmissive element. Wherein the optical element group is disposed between the first lens and the third lens, and includes, in order from the visual side to the image source side: an absorptive polarizer, a reflective polarizer and a phase retarder. The optical lens assembly may become lightweight and have good image quality when satisfying a specific condition.

20 Claims, 11 Drawing Sheets

OPTICAL LENS ASSEMBLY AND HEAD-MOUNTED ELECTRONIC DEVICE

BACKGROUND

Field of the Invention

The present invention relates to an optical lens assembly and head-mounted electronic device, and more particularly to an optical lens assembly applicable to head-mounted electronic devices.

Description of Related Art

With the development of the semiconductor industry, the functions of various consumer electronic products are increasingly powerful. Moreover, various services of the software application end emerge. These enable consumers to have more choices. Virtual reality (VR) technology, Augmented reality (AR) technology and Mixed reality (MR) technology emerge when the market is no longer satisfied with handheld electronic products. Nowadays, the application of virtual reality opens up a blue ocean market for consumer electronics, and in the application field of virtual reality, the first commercialized project is the head-mounted display.

However, the current head-mounted displays are heavy and have poor image quality.

The present invention mitigates and/or obviates the aforementioned disadvantages.

SUMMARY

The objective of the present invention is to provide an optical lens assembly and a head-mounted electronic device, which can reduce the number of lenses by folding the light path, so as to reduce the weight of the device, and also can provide better image quality.

Therefore, an optical lens assembly in accordance with an embodiment of the present invention includes: an optical element group; and in order from a visual side to an image source side: a first lens with positive refractive power, a second lens with refractive power, a third lens with refractive power, and an image source-side surface of the third lens being convex in a paraxial region thereof, and a partial-reflective-partial-transmissive element. Wherein the optical element group is disposed between the first lens and the third lens, and includes, in order from the visual side to the image source side: an absorptive polarizer (that is, a first absorptive polarizer), a reflective polarizer and a phase retarder (that is, a first phase retarder). A radius of curvature of an image source-side surface of the first lens is R2, a thickness of the first lens along an optical axis is CT1, a focal length of the first lens is f1, a focal length of the optical lens assembly is f, and the following condition is satisfied: $-5.88 < (R2/CT1)*(f1/f) < 110.22$.

When $-5.88 < (R2/CT1)*(f1/f) < 110.22$ is satisfied, the distortion of the optical lens assembly can be effectively improved, the aberration of the optical lens assembly can be reduced, and the size of the lens can be further reduced.

Optionally, a focal length of the third lens is f3, the focal length of the optical lens assembly is f, and the following condition is satisfied: $-6.92 < f3/f < 23.80$, so that the ratio of the focal length of the third lens to that of the optical lens assembly can enhance the wide-field of view characteristic of the optical lens assembly, thereby providing a larger field of view and maintaining the illumination of the optical lens assembly.

Optionally, the focal length of the third lens is f3, a radius of curvature of a visual-side surface of the first lens is R1, and the following condition is satisfied: $-5.58 < f3/R1 < 27.18$, which can effectively improve the aberration of the optical lens assembly, further improving the image quality.

Optionally, a maximum effective radius of the visual-side surface of the first lens is CA1, an absolute value of a displacement in parallel to the optical axis from an intersection between the visual-side surface of the first lens and the optical axis to the maximum effective radius position on the visual-side surface of the first lens is TDP1, and the following condition is satisfied: $1.76 < CA1/TDP1 < 137.17$, which can achieve a larger field of view and reduce the size of the lens.

Optionally, a maximum effective radius of the image source-side surface of the first lens is CA2, an absolute value of a displacement in parallel to the optical axis from an intersection between the image source-side surface of the first lens and the optical axis to the maximum effective radius position on the image source-side surface of the first lens is TDP2, and the following condition is satisfied: $1.43 < CA2/TDP2 < 56.16$, which can achieve a larger field of view and reduce the size of the lens.

Optionally, a radius of curvature of the image source-side surface of the third lens is R6, a thickness of the third lens along the optical axis is CT3, and the following condition is satisfied: $-58.44 < R6/CT3 < -5.15$, which is conducive to achieving a proper balance between the radius of curvature and the thickness of the third lens.

Optionally, the radius of curvature of the visual-side surface of the first lens is R1, the radius of curvature of the image source-side surface of the first lens is R2, the focal length of the first lens is f1, and the following condition is satisfied: $-32.71 \text{ mm} < (R1*R2)/f1 < 60.84 \text{ mm}$, which is conducive to achieving the more appropriate distribution of the radius of curvature of the first lens, thereby reducing the chromatic aberration.

Optionally, the radius of curvature of the visual-side surface of the first lens is R1, the radius of curvature of the image source-side surface of the first lens is R2, and the following condition is satisfied: $-3.55 < R1/R2 < 6.52$, which is conducive to preventing the radius of curvature from being too small and reducing the sensitivity to the assembly tolerance as the two radii of curvature of the first lens are conditioned by each other.

Optionally, the radius of curvature of the image source-side surface of the third lens is R6, the radius of curvature of the image source-side surface of the first lens is R2, and the following condition is satisfied: $-4.59 < R6/R2 < 6.08$, which is conducive to preventing the radius of curvature from being too small and reducing the sensitivity to the assembly tolerance as the two radii of curvature are conditioned by each other.

Optionally, a thickness of the second lens along the optical axis is CT2, the thickness of the third lens along the optical axis is CT3, and the following condition is satisfied: $0.22 < CT3/CT2 < 7.58$, which is conducive to ensuring that the thickness of the optical lens assembly can meet the processing requirement of the manufacturing process of the lens device, while ensuring the image quality.

Optionally, the thickness of the first lens along the optical axis is CT1, the thickness of the second lens along the optical axis is CT2, the thickness of the third lens along the optical axis is CT3, and the following condition is satisfied:

$0.62<(CT1+CT2)/CT3<8.67$, which is conducive to improving the thickness matching between the lenses and ensuring the assembly stability, while ensuring the image quality.

Optionally, the radius of curvature of the visual-side surface of the first lens is R1, the thickness of the first lens along the optical axis is CT1, and the following condition is satisfied: $-13.48<R1/CT1<9.76$, so that the distortion of the optical lens assembly can be effectively improved, the aberration of the optical lens assembly can be reduced, and the size of the lens can be further reduced.

Optionally, the focal length of the first lens is f1, the focal length of the optical lens assembly is f, and the following condition is satisfied: $1.42<f1/f<16.1$, so that the ratio of the focal length of the first lens to that of the optical lens assembly can enhance the wide-field of view characteristic of the optical lens assembly, thereby providing a larger field of view and maintaining the illumination of the optical lens assembly.

Optionally, the maximum effective radius of the image source-side surface of the first lens is CA2, a distance from the visual-side surface of the first lens to an image source plane along the optical axis is TL, the radius of curvature of the visual-side surface of the first lens is R1, and the following condition is satisfied: $-49.53$ mm$<(CA2/TL)*R1<43.8$ mm, which is conducive to achieving a proper balance between the radius of curvature, the size of the first lens, and the length of the optical lens assembly.

Optionally, the focal length of the first lens is f1, the focal length of the third lens is f3, and the following condition is satisfied: $-1.10<f1/f3<3.53$, which is conducive to achieving the more appropriate distribution of the refractive power of the optical lens assembly, thereby reducing the aberration.

Optionally, a focal length of the second lens is f2, the focal length of the optical lens assembly is f, and the following condition is satisfied: $-5.80<f2/f<13.35$, so that the ratio of the focal length of the second lens to that of the optical lens assembly can enhance the wide-field of view characteristic of the optical lens assembly, thereby providing a larger field of view and maintaining the illumination of the optical lens assembly.

Optionally, the radius of curvature of the image source-side surface of the third lens is R6, a radius of curvature of a visual-side surface of the third lens is R5, and the following condition is satisfied: $-1.37<R6/R5<3.67$, which is conducive to preventing the radius of curvature from being too small and reducing the sensitivity to the assembly tolerance as the two radii of curvature of the third lens are conditioned by each other.

Moreover, a head-mounted electronic device in accordance with an embodiment of the present invention includes a housing, the aforementioned optical lens assembly disposed in the housing, an image source disposed on the image source plane of the optical lens assembly in the housing, and a controller disposed in the housing and electrically connected to the image source.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
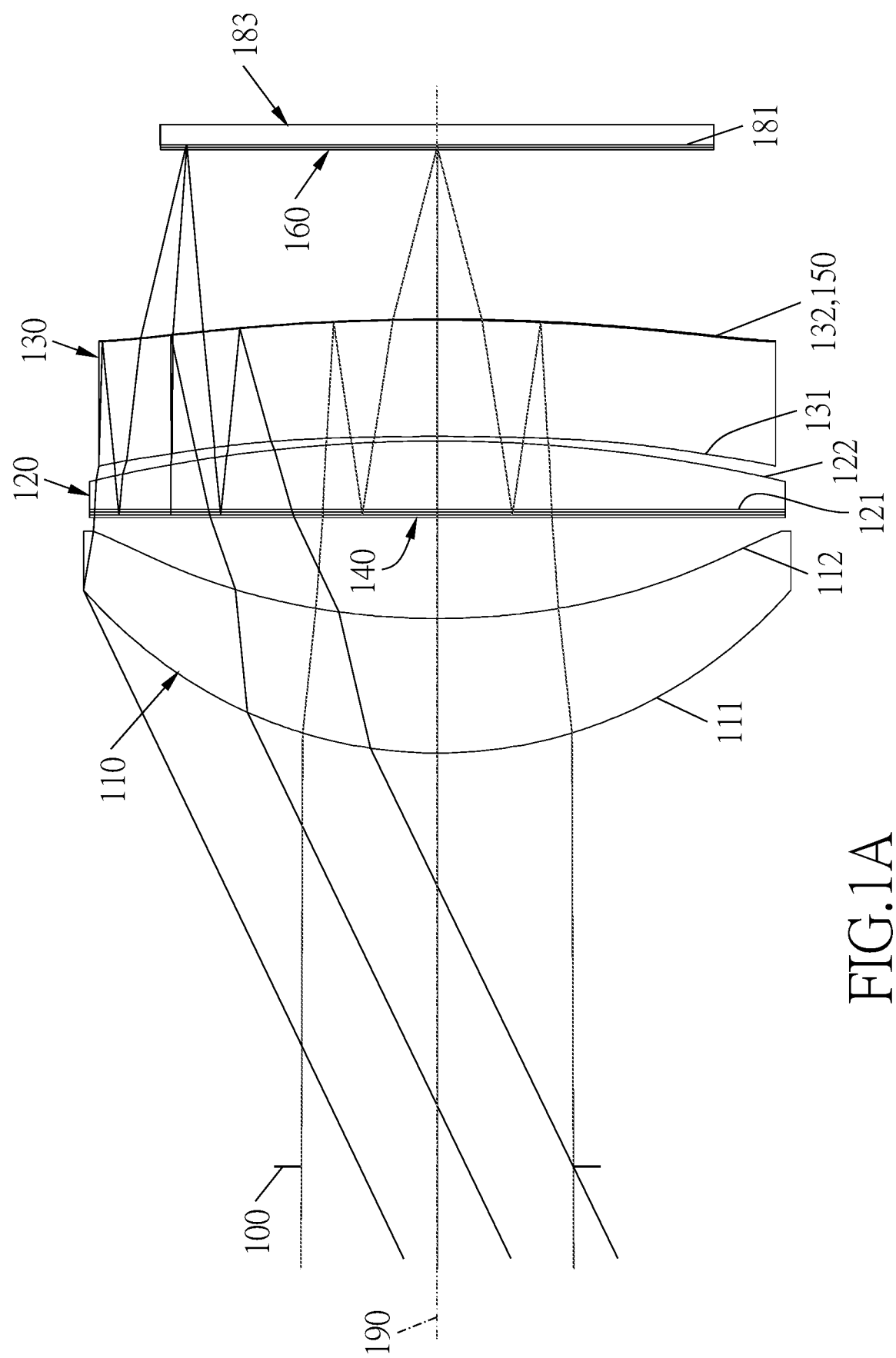
FIG. 1A is a schematic view of an optical lens assembly in accordance with a first embodiment of the present invention.
Figure 1B:
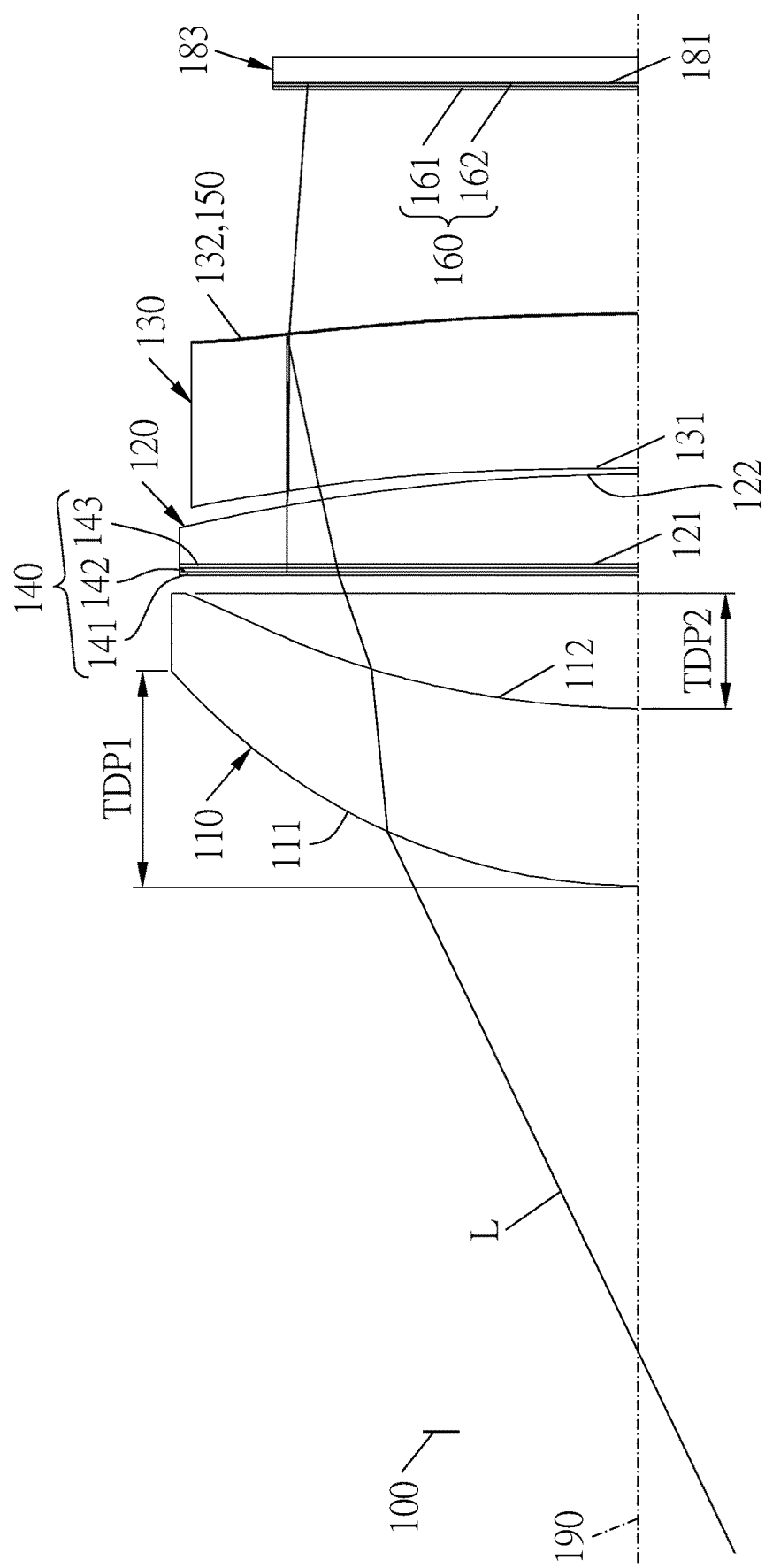
FIG. 1B is a schematic diagram of a part of the optical lens assembly of FIG. 1A with a light path of a chief ray therein.
Figure 1C:
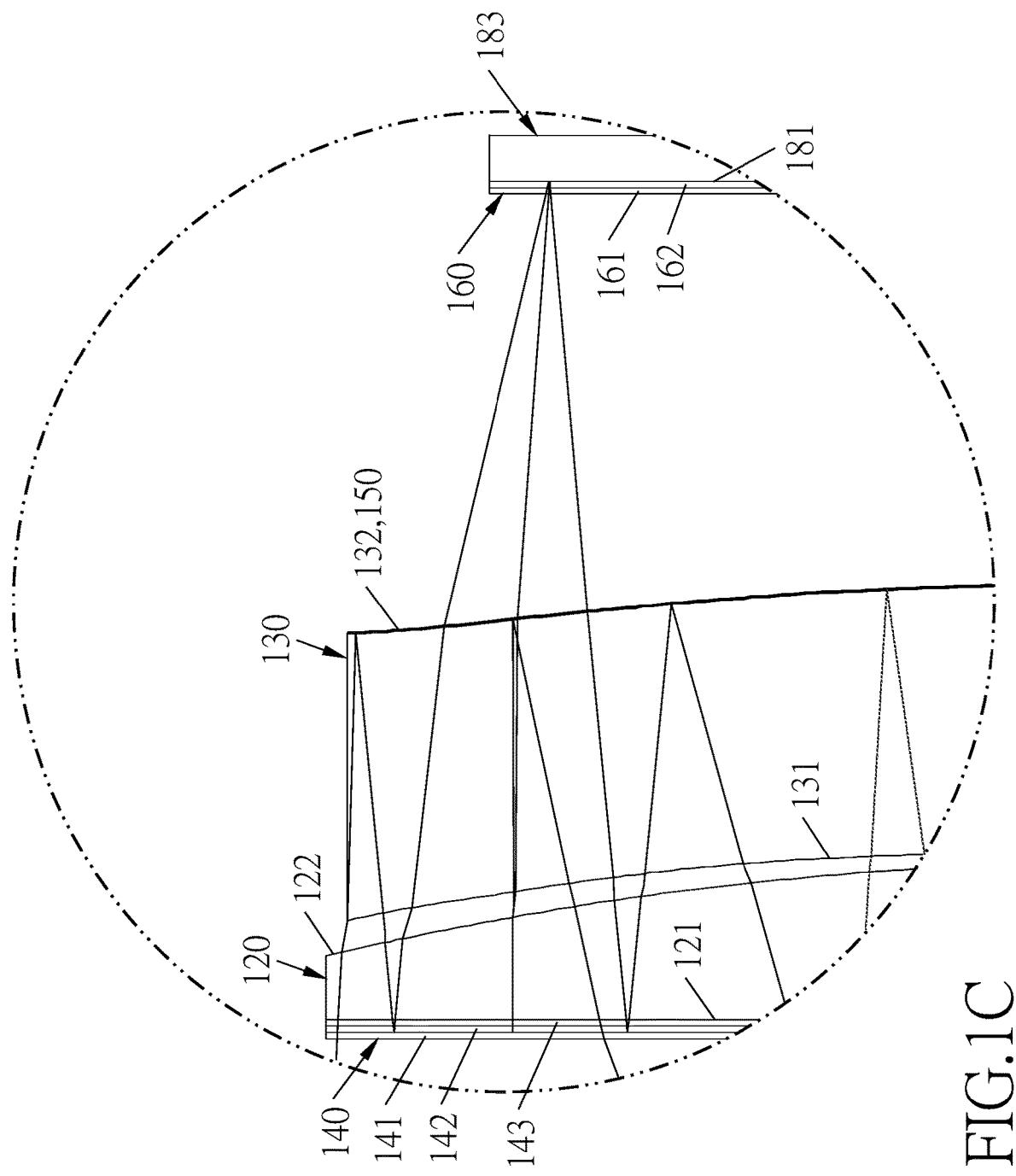
FIG. 1C is a partial amplified view of FIG. 1A.

Referring to FIGS. 1A, 1B and 1C, an optical lens assembly in accordance with a first embodiment of the present invention includes, in order from a visual side to an image source side along an optical axis 190: a stop 100, a first lens 110, a first optical element group 140, a second lens 120, a third lens 130, a partial-reflective-partial-transmissive element 150, a second optical element group 160 and an image source plane 181. The optical lens assembly has a total of three lenses with refractive power, but not is limited thereto.

The stop 100 may be located in a position where the user's eyes view an image.

The first lens 110 with positive refractive power includes a visual-side surface 111 and an image source-side surface 112, the visual-side surface 111 of the first lens 110 is convex in a paraxial region thereof, the image source-side surface 112 of the first lens 110 is concave in a paraxial region thereof, the visual-side surface 111 and the image source-side surface 112 of the first lens 110 are aspheric, and the first lens 110 is made of plastic.

The second lens 120 with positive refractive power includes a visual-side surface 121 and an image source-side surface 122, the visual-side surface 121 of the second lens 120 is flat in a paraxial region thereof, the image source-side surface 122 of the second lens 120 is convex in a paraxial region thereof, the image source-side surface 122 of the second lens 120 is spherical, and the second lens 120 is made of plastic.

The third lens 130 with positive refractive power includes a visual-side surface 131 and an image source-side surface 132, the visual-side surface 131 of the third lens 130 is concave in a paraxial region thereof, the image source-side surface 132 of the third lens 130 is convex in a paraxial region thereof, the visual-side surface 131 and the image source-side surface 132 of the third lens 130 are aspheric, and the third lens 130 is made of plastic.

The first optical element group 140 is disposed on the visual-side surface 121 of the second lens 120 and includes, in order from the visual side to the image source side along the optical axis 190: a first absorptive polarizer 141, a reflective polarizer 142 and a first phase retarder 143. The first phase retarder 143 is disposed on the visual-side surface 121 of the second lens 120 and is, for example, but not limited to, a quarter-wave plate. The reflective polarizer 142 is disposed on the first phase retarder 143. The first absorptive polarizer 141 is disposed on the reflective polarizer 142. The first optical element group 140 is located between the first lens 110 and the third lens 130.

The partial-reflective-partial-transmissive element 150 is disposed on the image source-side surface 132 of the third lens 130 and has an average reflectance of at least 30%, preferably 50%, in the wavelength range of visible light. The average reflectance here is an average value of different reflectance of the partial-reflective-partial-transmissive element 150 for different wavelengths.

The second optical element group 160 is disposed on the image source plane 181 and includes, in order from the visual side to the image source side along the optical axis 190: a second phase retarder 161 and a second absorptive polarizer 162. The second absorptive polarizer 162 is disposed on the image source plane 181. The second phase retarder 161 is disposed on the second absorptive polarizer 162 and is, for example, but not limited to, a quarter-wave plate.

The optical lens assembly works in cooperation with an image source 183 disposed on the image source plane 181. In the present embodiment, the type of the image source 183 is, for example, but not limited to, an OLED display, a LED display, a liquid crystal display, or other displays.

The curve equation for the aspheric surface profiles of the respective lenses of the first embodiment is expressed as follows:

$$z(h) = \frac{ch^2}{1 + \left[1 - (k+1)c^2h^2\right]^{0.5}} + \sum (A_i) \cdot (h^i)$$

wherein:
z represents the value of a reference position at a height of h with respect to a vertex of the surface of a lens along the optical axis 190;
c represents a paraxial curvature (i.e., a curvature of a lens surface in a paraxial region thereof) equal to 1/R (R: a paraxial radius of curvature);
h represents a vertical distance from the point on the curve of the aspheric surface to the optical axis 190;
k represents the conic constant; and
$A_i$ represents the i-th order aspheric coefficient.

The optical lens assembly of the first embodiment utilizes the configuration and arrangement of the absorptive polarizer, the reflective polarizer, the phase retarders, the partial-reflective-partial-transmissive element and the lenses to fold the light path thereof by the transmission and reflection of light to shorten the length of the optical lens assembly required for forming an image without affecting the image quality. In a light path L in FIG. 1B, an unpolarized beam from the image source 183 turns to a linearly-polarized beam after passing through the second absorptive polarizer 162, the linearly-polarized beam turns to a circularly-polarized beam after passing through the second phase retarder 161, and the circularly-polarized beam then transmits to the partial-reflective-partial-transmissive element 150. A component of the circularly-polarized beam passes through the partial-reflective-partial-transmissive element 150, and then passes through the third lens 130, the second lens 120 and the first phase retarder 143 sequentially to turn to a linearly-polarized beam with a polarization direction parallel to the reflective axis of the reflective polarizer 142 and transmit to the reflective polarizer 142. This linearly-polarized beam is reflected by the reflective polarizer 142 and passes through the first phase retarder 143 again to turn to a circularly-polarized beam, and then passes through the second lens 120 and the third lens 130 sequentially to transmit to partial-reflective-partial-transmissive element 150. Then, a component of the circularly-polarized beam is reflected by the partial-reflective-partial-transmissive element 150, and then passes through the third lens 130, the second lens 120 and the first phase retarder 143 sequentially to turn to a linearly-polarized beam with a polarization direction vertical to the reflective axis of the reflective polarizer 142. Finally, the linearly-polarized beam transmits to the user's eyes after passing through the reflective polarizer 142, the first absorptive polarizer 141 and the first lens 110 sequentially.

Please refer to Tables 1-4, Table 1 shows the detailed optical data of the elements of the optical lens assembly of the first embodiment, Table 2 shows the aspheric coefficients of the aspherical surfaces of the elements of the optical lens assembly of the first embodiment, Table 3 shows the remaining parameters of the optical lens assembly of the first embodiment and the values thereof, and the values of the parameters in Tables 1 and 3 meet the conditional formulas of Table 4. A focal length of the first lens 110 is f1, a focal length of the second lens 120 is f2, a focal length of the third lens 130 is f3, a thickness of the first lens 110 along the optical axis 190 is CT1, a thickness of the second lens 120 along the optical axis 190 is CT2, a thickness of the third lens 130 along the optical axis 190 is CT3, a maximum effective radius of the visual-side surface 111 of the first lens 110 is CA1, a maximum effective radius of the image source-side surface 112 of the first lens 110 is CA2, an absolute value of a displacement in parallel to the optical axis 190 from an intersection between the visual-side surface 111 of the first lens 110 and the optical axis to the maximum effective radius position on the visual-side surface 111 of the first lens 110 is TDP1, an absolute value of a displacement in parallel to the optical axis 190 from an intersection between the image source-side surface 112 of the first lens 110 and the optical axis 190 to the maximum effective radius position on the image source-side surface 112 of the first lens 110 is TDP2, a radius of curvature of the visual-side surface 111 of the first lens 110 is R1, a radius of curvature of the image-side surface 112 of the first lens 110 is R2, a radius of curvature of the visual-side surface of 131 the third lens 130 is R5, a radius of curvature of the image source-side surface 132 of the third lens 130 is R6, a distance from the visual-side surface 111 of the first lens 110 to the image source plane 181 along the optical axis 190 is TL.

TABLE 1

Embodiment 1
f = 19.65 mm, EPD(Entrance pupil diameter) = 10.00 mm, FOV (Field of view) = 52.08°

| Surface | | Radius of curvature | Thickness/gap | Refractive index (nd) | Abbe number (vd) | Refraction/ reflection |
|---|---|---|---|---|---|---|
| 0 | Stop | Infinity | 15.000 | — | — | — |
| 1 | First lens | 17.211 | 4.879 | 1.544 | 55.9 | Refraction |
| 2 | | 27.594 | 3.660 | — | — | Refraction |
| 3 | First absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 2.475 | 1.544 | 55.9 | Refraction |
| 7 | | −56.364 | 0.165 | — | — | Refraction |
| 8 | Third lens | −146.533 | 4.238 | 1.544 | 55.900 | Refraction |
| 9 | Partial-reflective-partial-transmissive element | −87.756 | −4.238 | — | — | Reflection |
| 10 | | −56.364 | −0.165 | — | — | Refraction |
| 11 | Second lens | −146.533 | −2.475 | 1.544 | 55.900 | Refraction |
| 12 | First phase retarder | Infinity | −0.100 | 1.533 | 56.0 | Refraction |
| 13 | Reflective polarizer | Infinity | −0.100 | 1.533 | 56.0 | Refraction |
| 14 | Reflective polarizer | Infinity | 0.100 | — | — | Reflection |
| 15 | First phase retarder | Infinity | 0.100 | 1.533 | 56.0 | Refraction |
| 16 | Second lens | Infinity | 2.475 | 1.544 | 55.900 | Refraction |
| 17 | | −56.364 | 0.165 | — | — | Refraction |
| 18 | Third lens | −146.533 | 4.238 | 1.544 | 55.9 | Refraction |
| 19 | Partial-reflective-partial-transmissive element | −87.756 | 6.152 | — | — | Refraction |
| 20 | Second phase retarder | Infinity | 0.100 | 1.533 | 56.0 | Refraction |
| 21 | Second absorptive polarizer | Infinity | 0.100 | 1.533 | 56.0 | Refraction |
| 22 | Image source plane | Infinity | — | — | — | — |

The reference wavelength is 550 nm.

TABLE 2

Embodiment 1
Aspheric Coefficients

| Surface | 1 | 2 | 6, 12, 16 | 7, 10, 17 | 8, 11, 18 | 9, 19 |
|---|---|---|---|---|---|---|
| K: | −1.2068E−02 | 2.3959E−01 | 0.0000E+00 | 0.0000E+00 | 9.0000E+01 | 0.0000E+00 |
| A2: | 0.0000E+00 | 0.0000E+00 | 0.0000E+00 | 0.0000E+00 | 0.0000E+00 | 0.0000E+00 |
| A4: | −2.2912E−06 | 7.2200E−06 | 0.0000E+00 | 0.0000E+00 | −3.7084E−05 | −3.7367E−06 |
| A6: | 4.2764E−08 | 4.5178E−08 | 0.0000E+00 | 0.0000E+00 | 1.3923E−08 | −1.2232E−09 |
| A8: | −7.8998E−11 | −1.0456E−10 | 0.0000E+00 | 0.0000E+00 | 4.0522E−10 | 2.1979E−10 |
| A10: | −7.8962E−13 | −4.1630E−13 | 0.0000E+00 | 0.0000E+00 | 4.2746E−12 | 5.3435E−13 |
| A12: | −9.0492E−16 | −4.2221E−15 | 0.0000E+00 | 0.0000E+00 | 1.8432E−14 | −2.2481E−15 |
| A14: | 8.7059E−18 | −4.0336E−17 | 0.0000E+00 | 0.0000E+00 | −2.2142E−17 | 2.5722E−17 |
| A16: | 5.5507E−21 | −8.6824E−20 | 0.0000E+00 | 0.0000E+00 | −1.1992E−18 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 3

Embodiment 1

| f1 [mm] | 71.67 | CA1 [mm] | 13.01 | TDP1 [mm] | 5.91 |
|---|---|---|---|---|---|
| f2 [mm] | 102.99 | CA2 [mm] | 12.64 | TDP2 [mm] | 3.16 |
| f3 [mm] | 389.82 | — | | — | — |

TABLE 4

Embodiment 1

| f1/f | 3.65 | f3/f | 19.83 |
|---|---|---|---|
| R1/R2 | 0.62 | R6/R5 | 0.60 |
| R6/R2 | −3.18 | R6/CT3 | −20.71 |
| CT3/CT2 | 1.71 | (R1*R2)/f1 | 1.22 |
| (CT1 + CT2)/CT3 | 1.74 | CA1/TDP1 | 2.20 |
| R1/CT1 | 3.53 | CA2/TDP2 | 4.01 |

TABLE 4-continued

Embodiment 1

| f3/R1 | 22.65 | (CA2/TL)*R1 | 9.86 |
|---|---|---|---|
| f1/f3 | 0.18 | (R2/CT1)(f1/f) | 20.62 |
| f2/f | 5.24 | — | — |

In Table 1, the units of the radius of curvature, the thickness, the gap and the focal length are expressed in mm, and the surface numbers 22-0 respectively represent the surfaces to which the light sequentially transmits from the image source plane 181 to the stop 100 along the light path L, wherein the surface 0 represents a gap between the stop 100 (or the user's eyes) and the visual-side surface 111 of the first lens 110 along the optical axis 190; the surface 1 represents the thickness of the first lens 110 along the optical axis 190; the surface 2 represents a gap between the image source-side surface 112 of the first lens 110 and the first absorptive polarizer 141 along the optical axis 190; the surface 3 represents the thickness of the first absorptive polarizer 141 along the optical axis 190; the surfaces 4, 13 and 14 represent the thickness of the reflective polarizer 142 along the optical axis 190; the surfaces 5, 12 and 15 represent the thickness of the first phase retarder 143 along the optical axis 190; the surfaces 6 and 16 represent the thickness of the second lens 120 along the optical axis 190; the surface 11 represents a gap between the image source-side surface 122 of the second lens 120 and the visual-side surface 121 of the second lens 120 along the optical axis 190, this gap corresponds to the thickness of the second lens 120 along the optical axis 190; the surfaces 7, 10 and 17 represent a gap between the image source-side surface 122 of the second lens 120 and the visual-side surface 131 of the third lens 130 along the optical axis 190; the surfaces 8 and 18 represent the thickness of the third lens 130 along the optical axis 190; the surface 9 represents a gap between the image source-side surface 132 of the third lens 130 and the visual-side surface 131 of the third lens 130 along the optical axis 190, this gap corresponds to the thickness of the third lens 130 along the optical axis 190; the surfaces 19 represents a gap between the image source-side surface 132 of the third lens 130 and the second phase retarder 161 along the optical axis 190; the surface 20 represents the thickness of the second phase retarder 161 along the optical axis 190; the surface 21 represents the thickness of the second absorptive polarizer 162 along the optical axis 190; and the surface 22 is the image source plane 181. The gaps and thicknesses having a positive sign in Table 1 denote the transmission direction of light is toward the stop 100, and the gaps and thicknesses having a negative sign in Table 1 denote the transmission direction of light is toward the image source plane 181.

In table 2, k represents the conic constant of the equation of aspheric surface profiles, and A2, A4, A6, A8, A10, A12, A14, A16, A18, and A20 represent the high-order aspheric coefficients.

The respective tables presented below for respective one of other embodiments are based on the schematic view of this embodiment, and the definitions of parameters in the tables are the same as those in Tables 1-4 of the first embodiment. However, the definition of each surface number in Table 1 varies with the number of the lenses and the position of the optical elements, and the relevant description of the embodiments may be referred to the definition mode of each surface number in Table 1. Therefore, an explanation in this regard will not be provided again.

Second Embodiment

Figure 2:
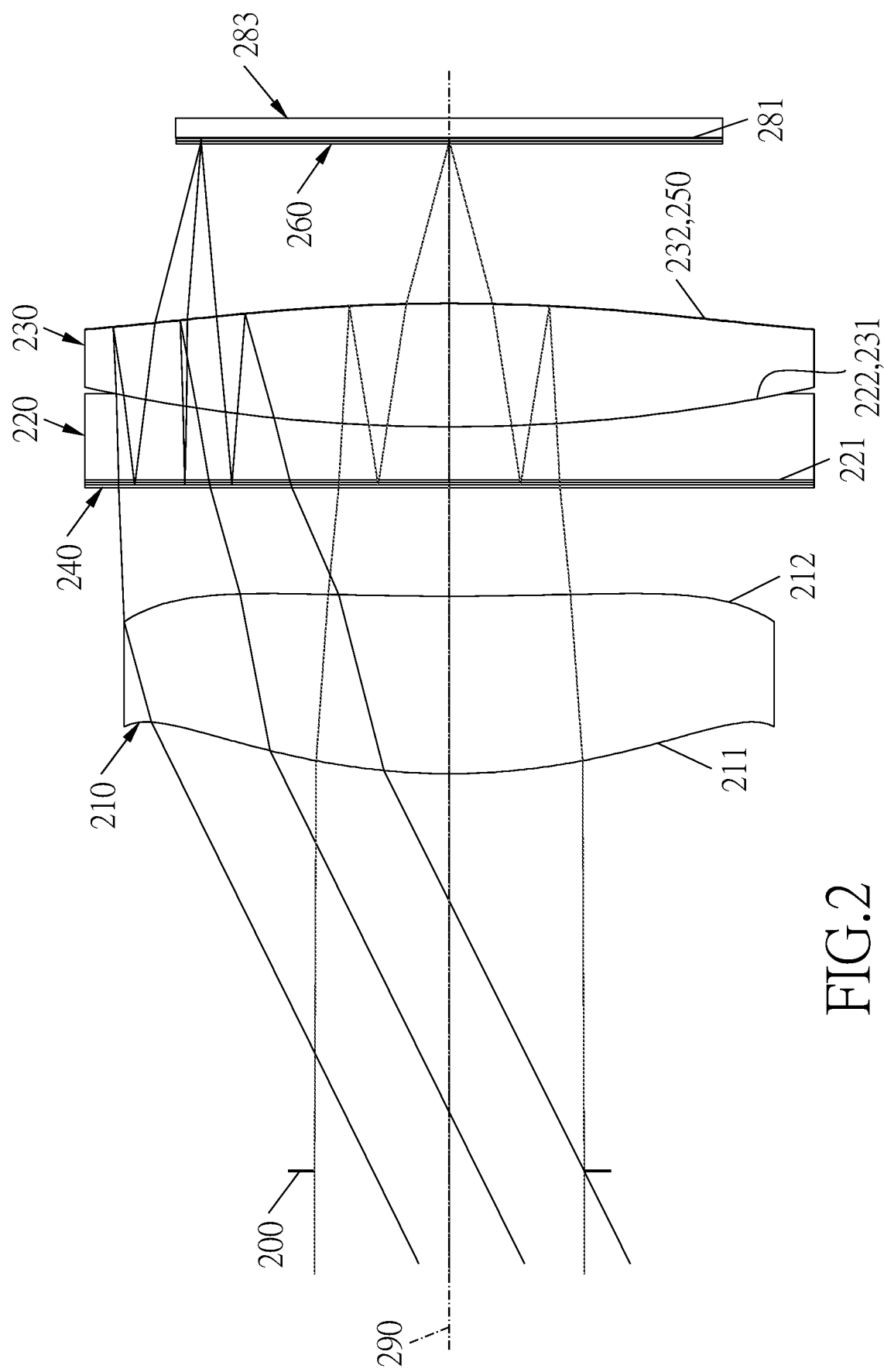
FIG. 2 is a schematic view of an optical lens assembly in accordance with a second embodiment of the present invention.

Referring to FIG. 2, an optical lens assembly in accordance with a second embodiment of the present invention includes, in order from a visual side to an image source side along an optical axis 290: a stop 200, a first lens 210, a first optical element group 240, a second lens 220, a third lens 230, a partial-reflective-partial-transmissive element 250, a second optical element group 260 and an image source plane 281. The optical lens assembly has a total of three lenses with refractive power, but not is limited thereto.

The stop 200 may be located in a position where the user's eyes view an image.

The first lens 210 with positive refractive power includes a visual-side surface 211 and an image source-side surface 212, the visual-side surface 211 of the first lens 210 is convex in a paraxial region thereof, the image source-side surface 212 of the first lens 210 is concave in a paraxial region thereof, the visual-side surface 211 and the image source-side surface 212 of the first lens 210 are aspheric, and the first lens 210 is made of plastic.

The second lens 220 with negative refractive power includes a visual-side surface 221 and an image source-side surface 222, the visual-side surface 221 of the second lens 220 is flat in a paraxial region thereof, the image source-side surface 222 of the second lens 220 is concave in a paraxial region thereof, the image source-side surface 222 of the second lens 220 is spherical, and the second lens 220 is made of plastic.

The third lens 230 with positive refractive power includes a visual-side surface 231 and an image source-side surface 232, the visual-side surface 231 of the third lens 230 is convex in a paraxial region thereof, the image source-side surface 232 of the third lens 230 is convex in a paraxial region thereof, the visual-side surface 231 of the third lens 230 is spherical, the image source-side surface 232 of the third lens 230 is aspheric, and the third lens 230 is made of plastic. The third lens 230 and the second lens 220 together form a cemented doublet lens.

The first optical element group 240 is disposed on the visual-side surface 221 of the second lens 220 and includes, in order from the visual side to the image source side along the optical axis 290: a first absorptive polarizer, a reflective polarizer and a first phase retarder. The configuration of the first absorptive polarizer, the reflective polarizer and the first phase retarder is the same as that of the first absorptive polarizer 141, the reflective polarizer 142 and the first phase retarder 143 of the first embodiment and will not be explained again.

The partial-reflective-partial-transmissive element 250 is disposed on the image source-side surface 232 of the third lens 230 and has an average reflectance of at least 30%, preferably 50%, in the wavelength range of visible light. The average reflectance here is an average value of different reflectance of the partial-reflective-partial-transmissive element 250 for different wavelengths.

The second optical element group 260 is disposed on the image source plane 281 and includes, in order from the visual side to the image source side along the optical axis 290: a second phase retarder and a second absorptive polarizer. The configuration of the second phase retarder and the second absorptive polarizer is the same as that of the second phase retarder 161 and the second absorptive polarizer 162 of the first embodiment and will not be explained again.

The optical lens assembly works in cooperation with an image source 283 disposed on the image source plane 281. In the present embodiment, the type of the image source 283 is, for example, but not limited to, an OLED display, a LED display, a liquid crystal display, or other displays.

Please refer to Tables 5-8, Table 5 shows the detailed optical data of the elements of the optical lens assembly of the second embodiment, Table 6 shows the data of the aspherical surfaces of the lenses of the optical lens assembly of the second embodiment, Table 7 shows the remaining parameters of the optical lens assembly of the second embodiment and the values thereof, and the values of the parameters in Tables 5 and 7 meet the conditional formulas of Table 8. In the second embodiment, the equation of the aspheric surface profiles of the aforementioned lenses is the same as the equation of the aspheric surface profiles of the aforementioned lenses in the first embodiment. The definitions of the surfaces in Table 5 can be referred to the relevant description of Table 1 and will not be explained again.

TABLE 5

Embodiment 2
f = 19.82 mm, EPD(Entrance pupil diameter) = 10.00 mm, FOV (Field of view) = 52.04°

| Surface | | Radius of curvature | Thickness/gap | Refractive index (nd) | Abbe number (vd) | Refraction/reflection |
|---|---|---|---|---|---|---|
| 0 | Stop | Infinity | 15.000 | — | — | — |
| 1 | First lens | 24.606 | 6.704 | 1.544 | 55.9 | Refraction |
| 2 | | 126.414 | 4.096 | — | — | Refraction |
| 3 | First absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 2.000 | 1.645 | 23.400 | Refraction |
| 7 | Third lens | 62.105 | 4.662 | 1.544 | 55.9 | Refraction |
| 8 | Partial-reflective-partial-transmissive element | −71.153 | −4.662 | — | — | Reflection |
| 9 | Second lens | 62.105 | −2.000 | 1.645 | 23.400 | Refraction |
| 10 | First phase retarder | Infinity | −0.100 | 1.533 | 56.0 | Refraction |
| 11 | Reflective polarizer | Infinity | −0.100 | 1.533 | 56.0 | Refraction |
| 12 | Reflective polarizer | Infinity | 0.100 | — | — | Reflection |
| 13 | First phase retarder | Infinity | 0.100 | 1.533 | 56.0 | Refraction |
| 14 | Second lens | Infinity | 2.000 | 1.645 | 23.400 | Refraction |
| 15 | Third lens | 62.105 | 4.662 | 1.544 | 55.9 | Refraction |
| 16 | Partial-reflective-partial-transmissive element | −71.153 | 6.038 | — | — | Refraction |
| 17 | Second phase retarder | Infinity | 0.100 | 1.533 | 56.0 | Refraction |
| 18 | Second absorptive polarizer | Infinity | 0.100 | 1.533 | 56.0 | Refraction |
| 19 | Image source plane | Infinity | — | — | — | — |

The reference wavelength is 550 nm.

TABLE 6

Embodiment 2
Aspheric Coefficients

| Surface | 1 | 2 | 6, 10, 14 | 7, 9, 15 | 7, 9, 15 | 8, 16 |
|---|---|---|---|---|---|---|
| K:   | −9.7435E+00  | 9.0000E+01   | 0.0000E+00 | 0.0000E+00 | 0.0000E+00 | 0.0000E+00 |
| A2:  | 0.0000E+00   | 0.0000E+00   | 0.0000E+00 | 0.0000E+00 | 0.0000E+00 | 0.0000E+00 |
| A4:  | 6.4634E−05   | −3.0925E−05  | 0.0000E+00 | 0.0000E+00 | 0.0000E+00 | 5.0297E−06 |
| A6:  | −6.9913E−07  | −3.6771E−07  | 0.0000E+00 | 0.0000E+00 | 0.0000E+00 | 1.2349E−08 |
| A8:  | 4.9207E−09   | 1.9661E−09   | 0.0000E+00 | 0.0000E+00 | 0.0000E+00 | 1.5945E−10 |
| A10: | −1.8438E−11  | −9.7058E−12  | 0.0000E+00 | 0.0000E+00 | 0.0000E+00 | −1.0803E−12 |
| A12: | −1.5556E−13  | −6.4398E−14  | 0.0000E+00 | 0.0000E+00 | 0.0000E+00 | 2.0297E−15 |
| A14: | 5.1182E−16   | 6.8206E−17   | 0.0000E+00 | 0.0000E+00 | 0.0000E+00 | 2.9897E−17 |
| A16: | 1.8205E−18   | 2.2308E−18   | 0.0000E+00 | 0.0000E+00 | 0.0000E+00 | −1.3317E−19 |
| A18: | 5.3367E−20   | 5.4754E−21   | 0.0000E+00 | 0.0000E+00 | 0.0000E+00 | 0.0000E+00 |
| A20: | −4.1168E−22  | −7.8393E−23  | 0.0000E+00 | 0.0000E+00 | 0.0000E+00 | 0.0000E+00 |

TABLE 7

Embodiment 2

| f1 [mm] | 54.56 | CA1 [mm] | 11.07 | TDP1 [mm] | 1.95 |
|---|---|---|---|---|---|
| f2 [mm] | −95.74 | CA2 [mm] | 12.07 | TDP2 [mm] | 0.97 |
| f3 [mm] | 61.35 | — | | — | — |

TABLE 8

Embodiment 2

| f1/f | 2.75 | f3/f | 3.10 |
|---|---|---|---|
| R1/R2 | 0.19 | R6/R5 | −1.15 |
| R6/R2 | −0.56 | R6/CT3 | −15.26 |
| CT3/CT2 | 2.33 | (R1*R2)/f1 | 50.70 |
| (CT1 + CT2)/CT3 | 1.87 | CA1/TDP1 | 5.68 |
| R1/CT1 | 3.67 | CA2/TDP2 | 12.45 |
| f3/R1 | 2.49 | (CA2/TL)*R1 | 12.37 |

TABLE 8-continued

Embodiment 2

| f1/f3 | 0.89 | (R2/CT1)(f1/f) | 51.91 |
|---|---|---|---|
| f2/f | −4.83 | — | |

Third Embodiment

Figure 3:
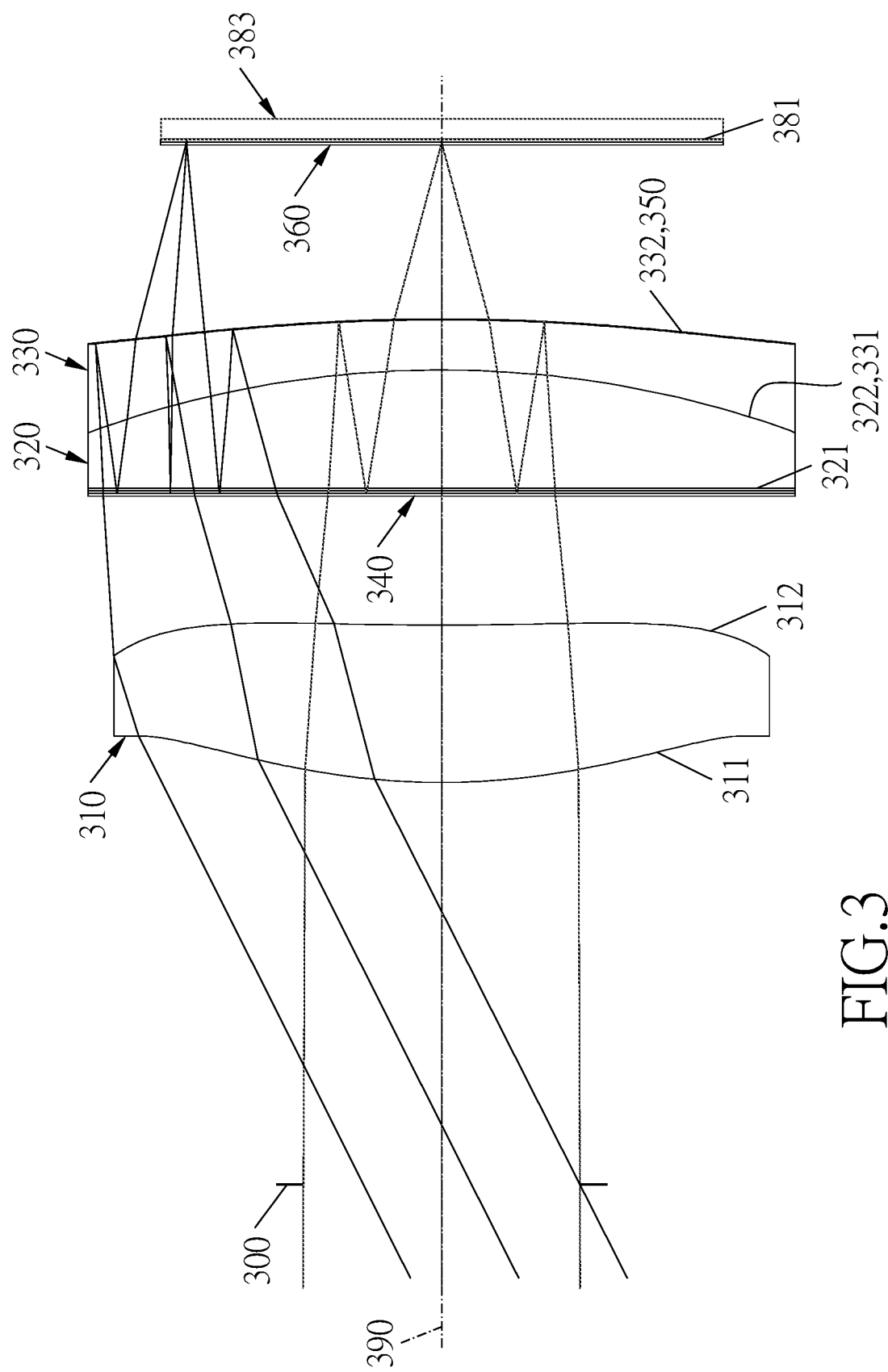
FIG. 3 is a schematic view of an optical lens assembly in accordance with a third embodiment of the present invention.

Referring to FIG. 3, an optical lens assembly in accordance with a third embodiment of the present invention includes, in order from a visual side to an image source side along an optical axis 390: a stop 300, a first lens 310, a first optical element group 340, a second lens 320, a third lens 330, a partial-reflective-partial-transmissive element 350, a second optical element group 360 and an image source plane 381. The optical lens assembly has a total of three lenses with refractive power, but not is limited thereto.

The stop 300 may be located in a position where the user's eyes view an image.

The first lens 310 with positive refractive power includes a visual-side surface 311 and an image source-side surface 312, the visual-side surface 311 of the first lens 310 is convex in a paraxial region thereof, the image source-side surface 312 of the first lens 310 is concave in a paraxial region thereof, the visual-side surface 311 and the image source-side surface 312 of the first lens 310 are aspheric, and the first lens 310 is made of plastic.

The second lens 320 with positive refractive power includes a visual-side surface 321 and an image source-side surface 322, the visual-side surface 321 of the second lens 320 is flat in a paraxial region thereof, the image source-side surface 322 of the second lens 320 is convex in a paraxial region thereof, the image source-side surface 322 of the second lens 320 is spherical, and the second lens 320 is made of plastic.

The third lens 330 with negative refractive power includes a visual-side surface 331 and an image source-side surface 332, the visual-side surface 331 of the third lens 330 is concave in a paraxial region thereof, the image source-side surface 332 of the third lens 330 is convex in a paraxial region thereof, the visual-side surface 331 of the third lens 330 is spherical, the image source-side surface 332 of the third lens 330 is aspheric, and the third lens 330 is made of plastic. The third lens 330 and the second lens 320 together form a cemented doublet lens.

The first optical element group 340 is disposed on the visual-side surface 321 of the second lens 320 and includes, in order from the visual side to the image source side along the optical axis 390: a first absorptive polarizer, a reflective polarizer and a first phase retarder. The configuration of the first absorptive polarizer, the reflective polarizer and the first phase retarder is the same as that of the first absorptive polarizer 141, the reflective polarizer 142 and the first phase retarder 143 of the first embodiment and will not be explained again.

The partial-reflective-partial-transmissive element 350 is disposed on the image source-side surface 332 of the third lens 330 and has an average reflectance of at least 30%, preferably 50%, in the wavelength range of visible light. The average reflectance here is an average value of different reflectance of the partial-reflective-partial-transmissive element 350 for different wavelengths.

The second optical element group 360 is disposed on the image source plane 381 and includes, in order from the visual side to the image source side along the optical axis 390: a second phase retarder and a second absorptive polarizer. The configuration of the second phase retarder and the second absorptive polarizer is the same as that of the second phase retarder 161 and the second absorptive polarizer 162 of the first embodiment and will not be explained again.

The optical lens assembly works in cooperation with an image source 383 disposed on the image source plane 381. In the present embodiment, the type of the image source 383 is, for example, but not limited to, an OLED display, a LED display, a liquid crystal display, or other displays.

Please refer to Tables 9-12, Table 9 shows the detailed optical data of the elements of the optical lens assembly of the third embodiment, Table 10 shows the data of the aspherical surfaces of the lenses of the optical lens assembly of the third embodiment, Table 11 shows the remaining parameters of the optical lens assembly of the third embodiment and the values thereof, and the values of the parameters in Tables 9 and 11 meet the conditional formulas of Table 12. In the third embodiment, the equation of the aspheric surface profiles of the aforementioned lenses is the same as the equation of the aspheric surface profiles of the aforementioned lenses in the first embodiment. The definitions of the surfaces in Table 9 can be referred to the relevant description of Table 1 and will not be explained again.

TABLE 9

Embodiment 3
f = 19.78 mm, EPD(Entrance pupil diameter) = 10.00 mm, FOV (Field of view) = 52.05°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | First lens | 24.533 | 5.875 | 1.544 | 55.9 | Refraction |
| 2 | | 126.787 | 4.805 | — | — | Refraction |
| 3 | First absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 4.413 | 1.544 | 55.9 | Refraction |
| 7 | Third lens | −36.214 | 1.891 | 1.645 | 23.400 | Refraction |
| 8 | Partial-reflective-partial-transmissive element | −72.358 | −1.891 | — | — | Reflection |
| 9 | Second lens | −36.214 | −4.413 | 1.544 | 55.900 | Refraction |
| 10 | First phase retarder | Infinity | −0.100 | 1.533 | 56.0 | Refraction |
| 11 | Reflective polarizer | Infinity | −0.100 | 1.533 | 56.0 | Refraction |
| 12 | Reflective polarizer | Infinity | 0.100 | — | — | Reflection |
| 13 | First phase retarder | Infinity | 0.100 | 1.533 | 56.0 | Refraction |
| 14 | Second lens | Infinity | 4.413 | 1.544 | 55.900 | Refraction |
| 15 | Third lens | −36.214 | 1.891 | 1.544 | 55.9 | Refraction |
| 16 | Partial-reflective-partial-transmissive element | −72.358 | 6.516 | — | — | Refraction |
| 17 | Second phase retarder | Infinity | 0.100 | 1.533 | 56.0 | Refraction |
| 18 | Second absorptive polarizer | Infinity | 0.100 | 1.533 | 56.0 | Refraction |
| 19 | Image source plane | Infinity | — | — | — | — |

The reference wavelength is 550 nm.

TABLE 10

Embodiment 3
Aspheric Coefficients

| Surface | 1 | 2 | 6, 10, 14 | 7, 9, 15 | 7, 9, 15 | 8, 16 |
|---|---|---|---|---|---|---|
| K: | −1.1894E+01 | 9.0000E+01 | 0.0000E+00 | 0.0000E+00 | 0.0000E+00 | 0.0000E+00 |
| A2: | 0.0000E+00 | 0.0000E+00 | 0.0000E+00 | 0.0000E+00 | 0.0000E+00 | 0.0000E+00 |
| A4: | 6.6598E−05 | −5.0930E−05 | 0.0000E+00 | 0.0000E+00 | 0.0000E+00 | 5.2297E−06 |
| A6: | −7.5449E−07 | −1.6412E−07 | 0.0000E+00 | 0.0000E+00 | 0.0000E+00 | 1.7442E−08 |
| A8: | 4.3204E−09 | −5.4893E−10 | 0.0000E+00 | 0.0000E+00 | 0.0000E+00 | −8.2624E−12 |
| A10: | −2.0618E−11 | −2.6110E−12 | 0.0000E+00 | 0.0000E+00 | 0.0000E+00 | 2.7055E−13 |
| A12: | −1.0590E−13 | −8.4544E−15 | 0.0000E+00 | 0.0000E+00 | 0.0000E+00 | −1.0573E−15 |
| A14: | 1.0188E−15 | 7.4121E−18 | 0.0000E+00 | 0.0000E+00 | 0.0000E+00 | 9.4549E−19 |
| A16: | 2.0165E−19 | 7.1377E−19 | 0.0000E+00 | 0.0000E+00 | 0.0000E+00 | −1.2703E−20 |
| A18: | 7.1422E−22 | 6.5305E−23 | 0.0000E+00 | 0.0000E+00 | 0.0000E+00 | 0.0000E+00 |
| A20: | −2.0311E−22 | −5.0571E−23 | 0.0000E+00 | 0.0000E+00 | 0.0000E+00 | 0.0000E+00 |

TABLE 11

Embodiment 3

| f1 [mm] | 54.48 | CA1 [mm] | 10.96 | TDP1 [mm] | 1.73 |
|---|---|---|---|---|---|
| f2 [mm] | 66.17 | CA2 [mm] | 11.86 | TDP2 [mm] | 1.16 |
| f3 [mm] | −114.11 | — | | — | — |

TABLE 12

Embodiment 3

| f1/f | 2.75 | f3/f | −5.77 |
|---|---|---|---|
| R1/R2 | 0.19 | R6/R5 | 2.00 |
| R6/R2 | −0.57 | R6/CT3 | −38.27 |
| CT3/CT2 | 0.43 | (R1*R2)/f1 | −27.26 |
| (CT1 + CT2)/CT3 | 5.44 | CA1/TDP1 | 6.33 |
| R1/CT1 | 4.18 | CA2/TDP2 | 10.21 |
| f3/R1 | −4.65 | (CA2/TL)*R1 | 12.13 |
| f1/f3 | −0.48 | (R2/CT1)(f1/f) | 59.43 |
| f2/f | 3.35 | — | — |

Fourth Embodiment

Figure 4:
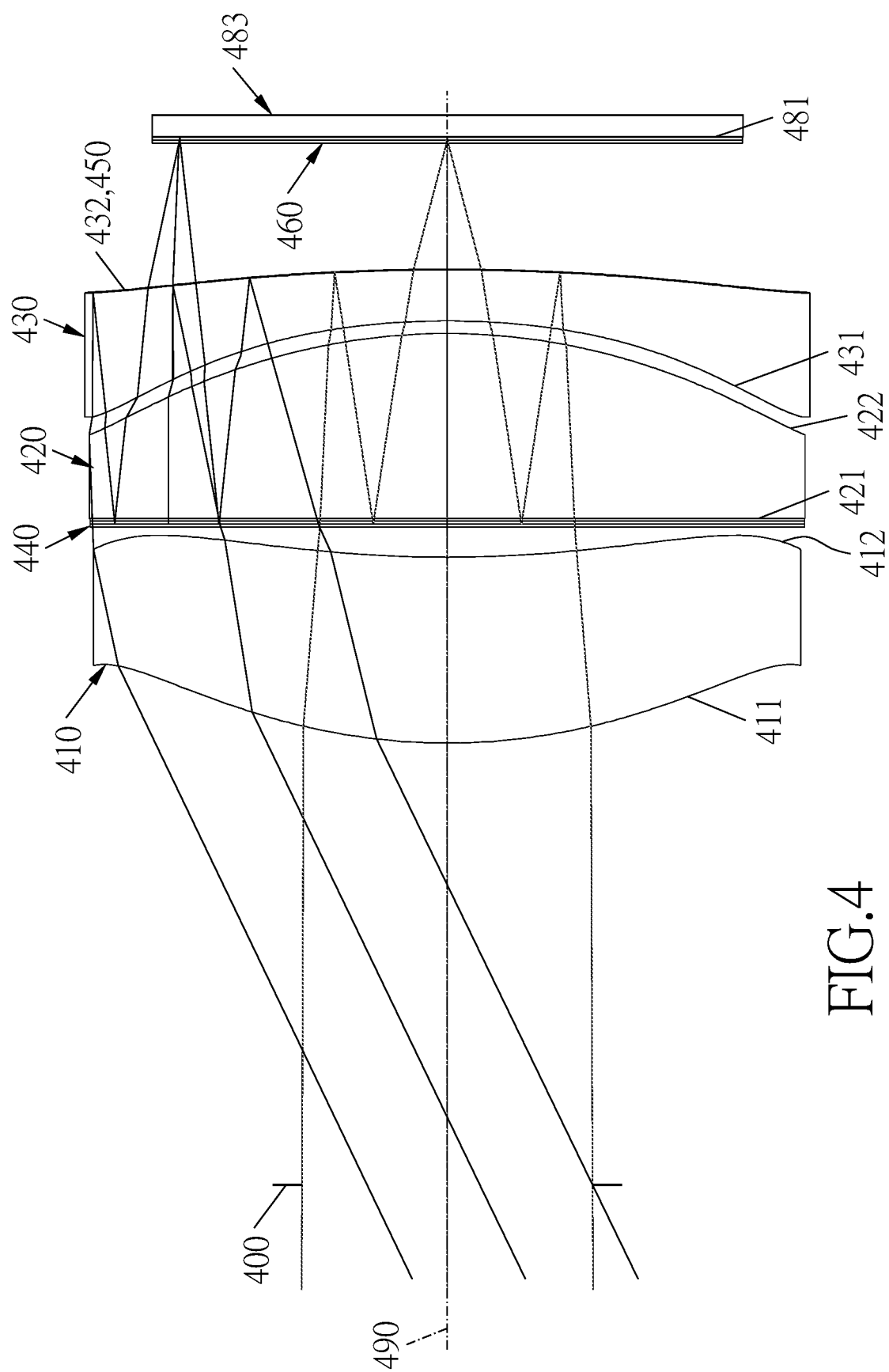
FIG. 4 is a schematic view of an optical lens assembly in accordance with a fourth embodiment of the present invention.

Referring to FIG. 4, an optical lens assembly in accordance with a fourth embodiment of the present invention includes, in order from a visual side to an image source side along an optical axis 490: a stop 400, a first lens 410, a first optical element group 440, a second lens 420, a third lens 430, a partial-reflective-partial-transmissive element 450, a second optical element group 460 and an image source plane 481. The optical lens assembly has a total of three lenses with refractive power, but not is limited thereto.

The stop 400 may be located in a position where the user's eyes view an image.

The first lens 410 with positive refractive power includes a visual-side surface 411 and an image source-side surface 412, the visual-side surface 411 of the first lens 410 is convex in a paraxial region thereof, the image source-side surface 412 of the first lens 410 is concave in a paraxial region thereof, the visual-side surface 411 and the image source-side surface 412 of the first lens 410 are aspheric, and the first lens 410 is made of plastic.

The second lens 420 with positive refractive power includes a visual-side surface 421 and an image source-side surface 422, the visual-side surface 421 of the second lens 420 is flat in a paraxial region thereof, the image source-side surface 422 of the second lens 420 is convex in a paraxial region thereof, the image source-side surface 422 of the second lens 420 is aspheric, and the second lens 420 is made of plastic.

The third lens 430 with negative refractive power includes a visual-side surface 431 and an image source-side surface 432, the visual-side surface 431 of the third lens 430 is concave in a paraxial region thereof, the image source-side surface 432 of the third lens 430 is convex in a paraxial region thereof, the visual-side surface 431 and the image source-side surface 432 of the third lens 430 are aspheric, and the third lens 430 is made of plastic.

The first optical element group 440 is disposed on the visual-side surface 421 of the second lens 420 and includes, in order from the visual side to the image source side along the optical axis 490: a first absorptive polarizer, a reflective polarizer and a first phase retarder. The configuration of the first absorptive polarizer, the reflective polarizer and the first phase retarder is the same as that of the first absorptive polarizer 141, the reflective polarizer 142 and the first phase retarder 143 of the first embodiment and will not be explained again.

The partial-reflective-partial-transmissive element 450 is disposed on the image source-side surface 432 of the third lens 430 and has an average reflectance of at least 30%, preferably 50%, in the wavelength range of visible light. The average reflectance here is an average value of different reflectance of the partial-reflective-partial-transmissive element 450 for different wavelengths.

The second optical element group 460 is disposed on the image source plane 481 and includes, in order from the visual side to the image source side along the optical axis 490: a second phase retarder and a second absorptive polarizer. The configuration of the second phase retarder and the second absorptive polarizer is the same as that of the second phase retarder 161 and the second absorptive polarizer 162 of the first embodiment and will not be explained again.

The optical lens assembly works in cooperation with an image source 483 disposed on the image source plane 481. In the present embodiment, the type of the image source 483 is, for example, but not limited to, an OLED display, a LED display, a liquid crystal display, or other displays.

Please refer to Tables 13-16, Table 13 shows the detailed optical data of the elements of the optical lens assembly of the fourth embodiment, Table 14 shows the data of the aspherical surfaces of the lenses of the optical lens assembly of the fourth embodiment, Table 15 shows the remaining parameters of the optical lens assembly of the fourth embodiment and the values thereof, and the values of the parameters in Tables 13 and 15 meet the conditional formulas of Table 16. In the fourth embodiment, the equation of the aspheric surface profiles of the aforementioned lenses is the same as the equation of the aspheric surface profiles of the aforementioned lenses in the first embodiment. The definitions of the surfaces in Table 13 can be referred to the relevant description of Table 1 and will not be explained again.

TABLE 13

Embodiment 4
f = 19.56 mm, EPD(Entrance pupil diameter) = 10.00 mm, FOV (Field of view) = 52.00°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | First lens | 21.291 | 6.306 | 1.544 | 55.9 | Refraction |
| 2 | | 43.174 | 1.025 | — | — | Refraction |
| 3 | First absorptive polarizer | Infinity | 0.100 | 1.533 | 56.0 | Refraction |
| 4 | Reflective polarizer | Infinity | 0.100 | 1.533 | 56.0 | Refraction |
| 5 | First phase retarder | Infinity | 0.100 | 1.533 | 56.0 | Refraction |
| 6 | Second lens | Infinity | 6.269 | 1.544 | 55.9 | Refraction |
| 7 | | −21.760 | 0.428 | — | — | Refraction |
| 8 | third lens | −27.707 | 1.740 | 1.544 | 55.900 | Refraction |
| 9 | Partial-reflective-partial-transmissive element | −84.726 | −1.740 | — | — | Reflection |
| 10 | | −21.760 | −0.428 | — | — | Refraction |
| 11 | Second lens | −27.707 | −6.269 | 1.544 | 55.900 | Refraction |
| 12 | First phase retarder | Infinity | −0.100 | 1.533 | 56.0 | Refraction |
| 13 | Reflective polarizer | Infinity | −0.100 | 1.533 | 56.0 | Refraction |
| 14 | Reflective polarizer | Infinity | 0.100 | — | — | Reflection |
| 15 | First phase retarder | Infinity | 0.100 | 1.533 | 56.0 | Refraction |
| 16 | Second lens | Infinity | 6.269 | 1.544 | 55.900 | Refraction |
| 17 | | −21.760 | 0.428 | — | — | Refraction |
| 18 | Third lens | −27.707 | 1.740 | 1.544 | 55.9 | Refraction |
| 19 | Partial-reflective-partial-transmissive element | −84.726 | 4.294 | — | — | Refraction |
| 20 | Second phase retarder | Infinity | 0.100 | 1.533 | 56.0 | Refraction |
| 21 | Second absorptive polarizer | Infinity | 0.100 | 1.533 | 56.0 | Refraction |
| 22 | Image source plane | Infinity | — | — | — | — |

The reference wavelength is 550 nm.

TABLE 14

Embodiment 4
Aspheric Coefficients

| Surface | 1 | 2 | 6, 12, 16 | 7, 10, 17 | 8, 11, 18 | 9, 19 |
|---|---|---|---|---|---|---|
| K: | −2.5932E−01 | −2.0810E+00 | 0.0000E+00 | −8.1323E−01 | −4.6842E−01 | 8.2000E+00 |
| A2: | 0.0000E+00 | 0.0000E+00 | 0.0000E+00 | 0.0000E+00 | 0.0000E+00 | 0.0000E+00 |
| A4: | −1.4555E−05 | −1.7511E−05 | 0.0000E+00 | 2.9577E−06 | −5.0664E−05 | −2.8280E−06 |
| A6: | 3.8026E−08 | −1.1557E−07 | 0.0000E+00 | −5.0314E−08 | 3.9196E−10 | 3.2122E−08 |
| A8: | −8.3422E−10 | −6.3251E−10 | 0.0000E+00 | −2.6171E−10 | 6.2425E−10 | 1.5667E−10 |
| A10: | −4.3414E−12 | −2.6505E−12 | 0.0000E+00 | 7.8191E−13 | 3.2496E−13 | 3.0556E−13 |
| A12: | 1.1171E−14 | −1.9553E−14 | 0.0000E+00 | 1.3185E−14 | 5.7519E−15 | −4.0344E−16 |
| A14: | 1.0867E−16 | −7.9811E−17 | 0.0000E+00 | 6.2014E−17 | 9.9697E−17 | −7.0206E−18 |
| A16: | −2.0298E−18 | 7.0121E−19 | 0.0000E+00 | 2.7812E−20 | 2.6410E−19 | 9.1281E−20 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 15

Embodiment 4

| f1 [mm] | 69.65 | CA1 [mm] | 11.32 | TDP1 [mm] | 2.62 |
|---|---|---|---|---|---|
| f2 [mm] | 39.76 | CA2 [mm] | 12.17 | TDP2 [mm] | 0.26 |
| f3 [mm] | −76.05 | — | | — | — |

TABLE 16

Embodiment 4

| f1/f | 3.56 | f3/f | −3.89 |
|---|---|---|---|
| R1/R2 | 0.49 | R6/R5 | 3.06 |
| R6/R2 | −1.96 | R6/CT3 | −48.70 |
| CT3/CT2 | 0.28 | (R1*R2)/f1 | −12.09 |
| (CT1 + CT2)/CT3 | 7.23 | CA1/TDP1 | 4.33 |
| R1/CT1 | 3.38 | CA2/TDP2 | 46.80 |

TABLE 16-continued

Embodiment 4

| f3/R1 | −3.57 | (CA2/TL)*R1 | 12.60 |
|---|---|---|---|
| f1/f3 | −0.92 | (R2/CT1)(f1/f) | 24.38 |
| f2/f | 2.03 | — | — |

Fifth Embodiment

Figure 5:
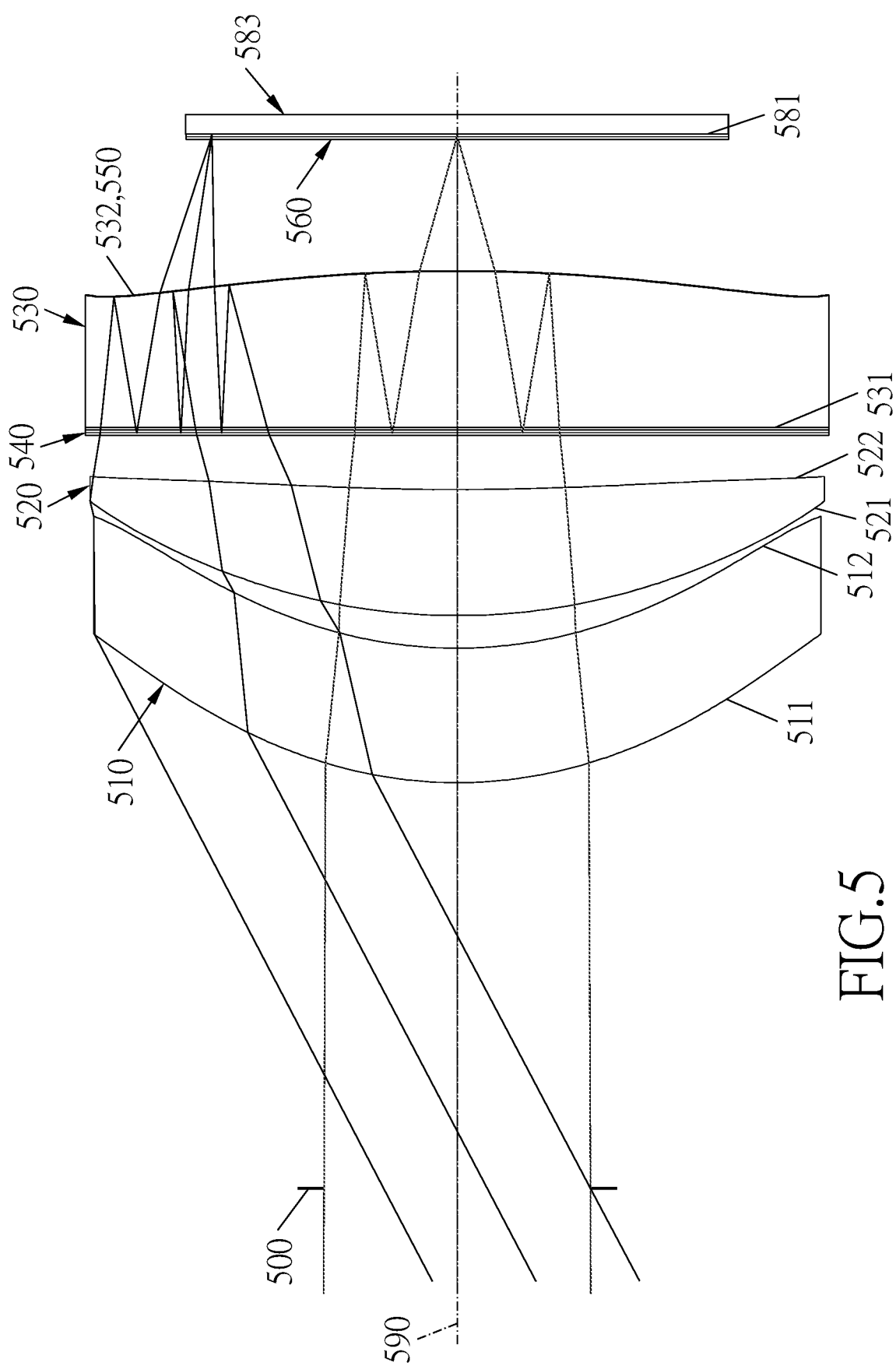
FIG. 5 is a schematic view of an optical lens assembly in accordance with a fifth embodiment of the present invention.

Referring to FIG. 5, an optical lens assembly in accordance with a fifth embodiment of the present invention includes, in order from a visual side to an image source side along an optical axis 590: a stop 500, a first lens 510, a second lens 520, a first optical element group 540, a third lens 530, a partial-reflective-partial-transmissive element 550, a second optical element group 560 and an image source plane 581. The optical lens assembly has a total of three lenses with refractive power, but not is limited thereto.

The stop 500 may be located in a position where the user's eyes view an image.

The first lens 510 with positive refractive power includes a visual-side surface 511 and an image source-side surface 512, the visual-side surface 511 of the first lens 510 is convex in a paraxial region thereof, the image source-side surface 512 of the first lens 510 is concave in a paraxial region thereof, the visual-side surface 511 and the image source-side surface 512 of the first lens 510 are aspheric, and the first lens 510 is made of plastic.

The second lens 520 with positive refractive power includes a visual-side surface 521 and an image source-side surface 522, the visual-side surface 521 of the second lens 520 is convex in a paraxial region thereof, the image source-side surface 522 of the second lens 520 is concave in a paraxial region thereof, the visual-side surface 521 and the image source-side surface 522 of the second lens 520 are aspheric, and the second lens 520 is made of plastic.

The third lens 530 with positive refractive power includes a visual-side surface 531 and an image source-side surface 532, the visual-side surface 531 of the third lens 530 is flat in a paraxial region thereof, the image source-side surface 532 of the third lens 530 is convex in a paraxial region thereof, the image source-side surface 532 of the third lens 530 is aspheric, and the third lens 530 is made of plastic.

The first optical element group 540 is disposed on the visual-side surface 531 of the third lens 530 and includes, in order from the visual side to the image source side along the optical axis 590: a first absorptive polarizer, a reflective polarizer and a first phase retarder. The configuration of the first absorptive polarizer, the reflective polarizer and the first phase retarder is the same as that of the first absorptive polarizer 141, the reflective polarizer 142 and the first phase retarder 143 of the first embodiment and will not be explained again.

The partial-reflective-partial-transmissive element 550 is disposed on the image source-side surface 532 of the third lens 530 and has an average reflectance of at least 30%, preferably 50%, in the wavelength range of visible light. The average reflectance here is an average value of different reflectance of the partial-reflective-partial-transmissive element 550 for different wavelengths.

The second optical element group 560 is disposed on the image source plane 581 and includes, in order from the visual side to the image source side along the optical axis 590: a second phase retarder and a second absorptive polarizer. The configuration of the second phase retarder and the second absorptive polarizer is the same as that of the second phase retarder 161 and the second absorptive polarizer 162 of the first embodiment and will not be explained again.

The optical lens assembly works in cooperation with an image source 583 disposed on the image source plane 581. In the present embodiment, the type of the image source 583 is, for example, but not limited to, an OLED display, a LED display, a liquid crystal display, or other displays.

Please refer to Tables 17-20, Table 17 shows the detailed optical data of the elements of the optical lens assembly of the fifth embodiment, Table 18 shows the data of the aspherical surfaces of the lenses of the optical lens assembly of the fifth embodiment, Table 19 shows the remaining parameters of the optical lens assembly of the fifth embodiment and the values thereof, and the values of the parameters in Tables 17 and 19 meet the conditional formulas of Table 20. In the fifth embodiment, the equation of the aspheric surface profiles of the aforementioned lenses is the same as the equation of the aspheric surface profiles of the aforementioned lenses in the first embodiment. The definitions of the surfaces in Table 17 can be referred to the relevant description of Table 1 and will not be explained again.

TABLE 17

Embodiment 5
f = 18.17 mm, EPD(Entrance pupil diameter) = 10.00 mm, FOV (Field of view) = 56.00°

| Surface | | Radius of curvature | Thickness/gap | Refractive index (nd) | Abbe number (vd) | Refraction/reflection |
|---|---|---|---|---|---|---|
| 0 | Stop | Infinity | 15.000 | — | — | — |
| 1 | First lens | 16.833 | 4.979 | 1.544 | 55.9 | Refraction |
| 2 | | 17.373 | 1.204 | — | — | Refraction |
| 3 | Second lens | 24.044 | 4.664 | 1.544 | 55.9 | Refraction |
| 4 | | 102.772 | 2.000 | — | — | Refraction |
| 5 | First absorptive polarizer | Infinity | 0.100 | 1.533 | 56.0 | Refraction |
| 6 | Reflective polarizer | Infinity | 0.100 | 1.533 | 56.0 | Refraction |
| 7 | First phase retarder | Infinity | 0.100 | 1.533 | 56.0 | Refraction |
| 8 | Third lens | Infinity | 5.784 | 1.544 | 55.900 | Refraction |
| 9 | Partial-reflective-partial-transmissive element | −66.430 | −5.784 | — | — | Reflection |
| 10 | First phase retarder | Infinity | −0.100 | 1.533 | 56.0 | Refraction |
| 11 | Reflective polarizer | Infinity | −0.100 | 1.533 | 56.0 | Refraction |
| 12 | Reflective polarizer | Infinity | 0.100 | — | — | Reflection |
| 13 | First phase retarder | Infinity | 0.100 | 1.533 | 56.0 | Refraction |
| 14 | Third lens | Infinity | 5.784 | 1.544 | 55.9 | Refraction |
| 15 | Partial-reflective-partial-transmissive element | −66.430 | 4.870 | — | — | Refraction |
| 16 | Second phase retarder | Infinity | 0.100 | 1.533 | 56.0 | Refraction |
| 17 | Second absorptive polarizer | Infinity | 0.100 | 1.533 | 56.0 | Refraction |
| 18 | Image source plane | Infinity | — | — | — | — |

The reference wavelength is 550 nm.

TABLE 18

Embodiment 5
Aspheric Coefficients

| Surface | 1 | 2 | 3 | 4 | 8, 10, 14 | 9, 15 |
|---|---|---|---|---|---|---|
| K: | −2.4483E−01 | 3.6440E−02 | −5.3088E−02 | −6.3630E+01 | 0.0000E+00 | −1.2456E+00 |
| A2: | 0.0000E+00 | 0.0000E+00 | 0.0000E+00 | 0.0000E+00 | 0.0000E+00 | 0.0000E+00 |
| A4: | −1.3939E−05 | −1.3675E−05 | −3.8894E−06 | −8.0253E−06 | 0.0000E+00 | 5.9760E−06 |
| A6: | 2.3663E−09 | −7.1810E−08 | −8.5553E−09 | −2.6639E−08 | 0.0000E+00 | 1.2082E−08 |
| A8: | −3.1998E−10 | −3.7038E−10 | −2.5552E−11 | 4.1260E−11 | 0.0000E+00 | −1.1398E−11 |
| A10: | −1.0722E−12 | −1.2803E−12 | 4.4043E−13 | 4.1232E−13 | 0.0000E+00 | 8.5732E−13 |
| A12: | 5.0972E−15 | −2.4952E−15 | −1.4351E−16 | 9.0535E−16 | 0.0000E+00 | −4.6428E−16 |
| A14: | 4.5081E−18 | −8.4687E−18 | −6.0146E−18 | 4.0754E−19 | 0.0000E+00 | −4.7947E−17 |
| A16: | −8.9487E−20 | 1.2044E−20 | 6.2660E−20 | −8.9767E−23 | 0.0000E+00 | 2.7543E−19 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 19

Embodiment 5

| f1 [mm] | 232.24 | CA1 [mm] | 13.61 | TDP1 [mm] | 5.47 |
|---|---|---|---|---|---|
| f2 [mm] | 56.18 | CA2 [mm] | 13.66 | TDP2 [mm] | 4.88 |
| f3 [mm] | 121.38 | — | | — | — |

TABLE 20

Embodiment 5

| f1/f | 12.78 | f3/f | 6.68 |
|---|---|---|---|
| R1/R2 | 0.97 | R6/R5 | 0.00 |
| R6/R2 | −3.82 | R6/CT3 | −11.49 |
| CT3/CT2 | 1.24 | (R1*R2)/f1 | 2.41 |
| (CT1 + CT2)/CT3 | 1.67 | CA1/TDP1 | 2.49 |
| R1/CT1 | 3.38 | CA2/TDP2 | 2.80 |
| f3/R1 | 7.21 | (CA2/TL)*R1 | 9.58 |
| f1/f3 | 1.91 | (R2/CT1)(f1/f) | 44.59 |
| f2/f | 3.09 | — | — |

Sixth Embodiment

Figure 6:
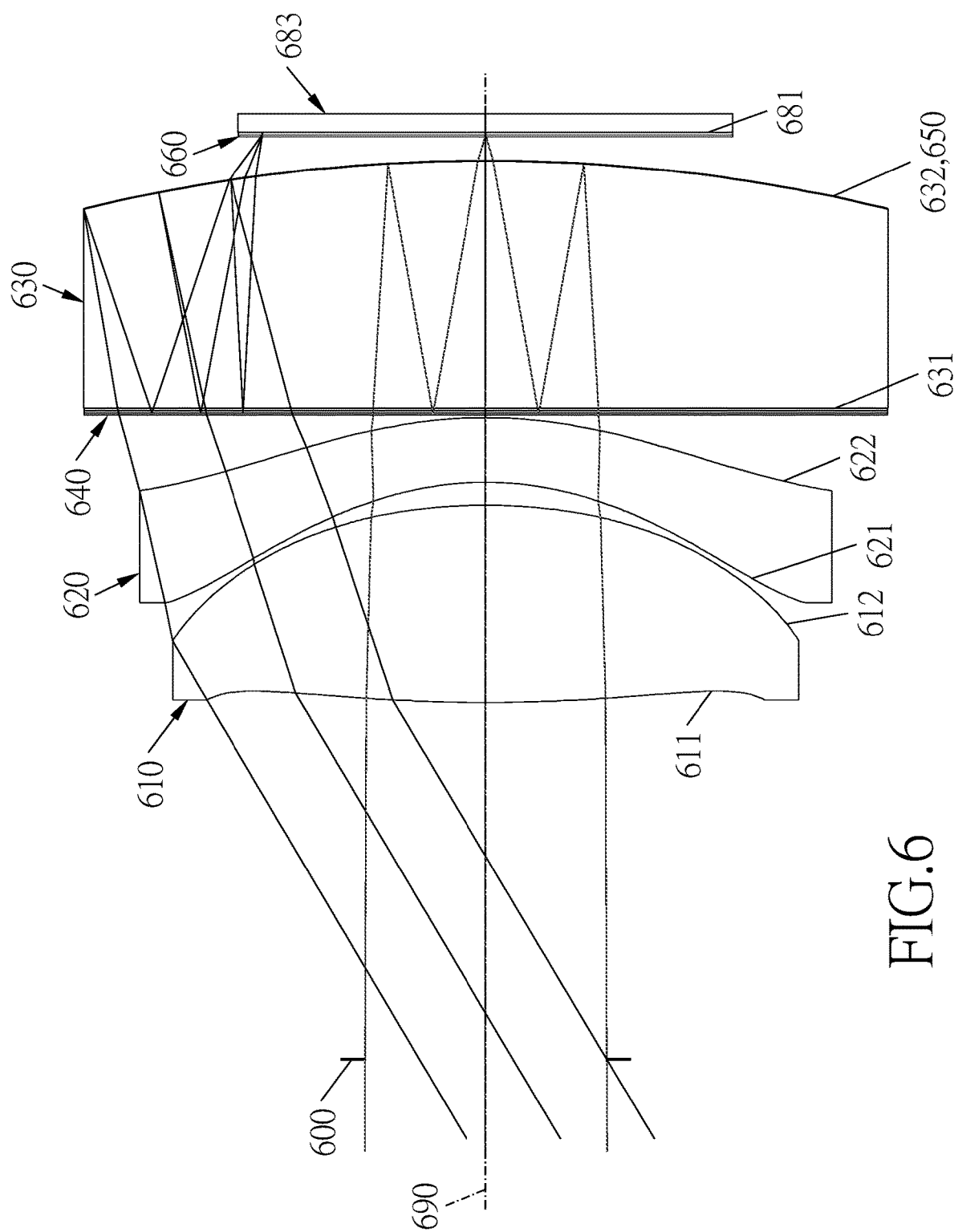
FIG. 6 is a schematic view of an optical lens assembly in accordance with a sixth embodiment of the present invention.

Referring to FIG. 6, an optical lens assembly in accordance with a sixth embodiment of the present invention includes, in order from a visual side to an image source side along an optical axis 690: a stop 600, a first lens 610, a second lens 620, a first optical element group 640, a third lens 630, a partial-reflective-partial-transmissive element 650, a second optical element group 660 and an image source plane 681. The optical lens assembly has a total of three lenses with refractive power, but not is limited thereto.

The stop 600 may be located in a position where the user's eyes view an image.

The first lens 610 with positive refractive power includes a visual-side surface 611 and an image source-side surface 612, the visual-side surface 611 of the first lens 610 is convex in a paraxial region thereof, the image source-side surface 612 of the first lens 610 is convex in a paraxial region thereof, the visual-side surface 611 and the image source-side surface 612 of the first lens 610 are aspheric, and the first lens 610 is made of plastic.

The second lens 620 with negative refractive power includes a visual-side surface 621 and an image source-side surface 622, the visual-side surface 621 of the second lens 620 is concave in a paraxial region thereof, the image source-side surface 622 of the second lens 620 is convex in a paraxial region thereof, the visual-side surface 621 and the image source-side surface 622 of the second lens 620 are aspheric, and the second lens 620 is made of plastic.

The third lens 630 with positive refractive power includes a visual-side surface 631 and an image source-side surface 632, the visual-side surface 631 of the third lens 630 is flat in a paraxial region thereof, the image source-side surface 632 of the third lens 630 is convex in a paraxial region thereof, the image source-side surface 632 of the third lens 630 is spherical, and the third lens 630 is made of plastic.

The first optical element group 640 is disposed on the visual-side surface 631 of the third lens 630 and includes, in order from the visual side to the image source side along the optical axis 690: a first absorptive polarizer, a reflective polarizer and a first phase retarder. The configuration of the first absorptive polarizer, the reflective polarizer and the first phase retarder is the same as that of the first absorptive polarizer 141, the reflective polarizer 142 and the first phase retarder 143 of the first embodiment and will not be explained again.

The partial-reflective-partial-transmissive element 650 is disposed on the image source-side surface 632 of the third lens 630 and has an average reflectance of at least 30%, preferably 50%, in the wavelength range of visible light. The average reflectance here is an average value of different reflectance of the partial-reflective-partial-transmissive element 650 for different wavelengths.

The second optical element group 660 is disposed on the image source plane 681 and includes, in order from the visual side to the image source side along the optical axis 690: a second phase retarder and a second absorptive polarizer. The configuration of the second phase retarder and the second absorptive polarizer is the same as that of the second phase retarder 161 and the second absorptive polarizer 162 of the first embodiment and will not be explained again.

The optical lens assembly works in cooperation with an image source 683 disposed on the image source plane 681. In the present embodiment, the type of the image source 683 is, for example, but not limited to, an OLED display, a LED display, a liquid crystal display, or other displays.

Please refer to Tables 21-24, Table 21 shows the detailed optical data of the elements of the optical lens assembly of the sixth embodiment, Table 22 shows the data of the aspherical surfaces of the lenses of the optical lens assembly of the sixth embodiment, Table 23 shows the remaining parameters of the optical lens assembly of the sixth embodiment and the values thereof, and the values of the parameters in Tables 21 and 23 meet the conditional formulas of Table 24. In the sixth embodiment, the equation of the aspheric surface profiles of the aforementioned lenses is the same as the equation of the aspheric surface profiles of the aforementioned lenses in the first embodiment. The definitions of the surfaces in Table 21 can be referred to the relevant description of Table 1 and will not be explained again.

TABLE 21

Embodiment 6
f = 18.14 mm, EPD(Entrance pupil diameter) = 10.00 mm, FOV (Field of view) = 60.52°

| Surface | | Radius of curvature | Thickness/gap | Refractive Index (nd) | Abbe number (vd) | Refraction/reflection |
|---|---|---|---|---|---|---|
| 0 | Stop | Infinity | 15.000 | — | — | — |
| 1 | First lens | 67.587 | 8.308 | 1.544 | 55.9 | Refraction |
| 2 | | −22.871 | 0.964 | — | — | Refraction |
| 3 | Second lens | −13.410 | 2.710 | 1.544 | 55.9 | Refraction |
| 4 | | −19.512 | 0.100 | — | — | Refraction |
| 5 | First absorptive polarizer | Infinity | 0.100 | 1.533 | 56.0 | Refraction |
| 6 | Reflective polarizer | Infinity | 0.100 | 1.533 | 56.0 | Refraction |
| 7 | First phase retarder | Infinity | 0.100 | 1.533 | 56.0 | Refraction |
| 8 | Third lens | Infinity | 10.418 | 1.544 | 55.900 | Refraction |
| 9 | Partial-reflective-partial-transmissive element | −69.351 | −10.418 | — | — | Reflection |
| 10 | First phase retarder | Infinity | −0.100 | 1.533 | 56.0 | Refraction |
| 11 | Reflective polarizer | Infinity | −0.100 | 1.533 | 56.0 | Refraction |
| 12 | Reflective polarizer | Infinity | 0.100 | — | — | Reflection |
| 13 | First phase retarder | Infinity | 0.100 | 1.533 | 56.0 | Refraction |
| 14 | Third lens | Infinity | 10.418 | 1.544 | 55.9 | Refraction |
| 15 | Partial-reflective-partial-transmissive element | −69.351 | 1.000 | — | — | Refraction |
| 16 | Second phase retarder | Infinity | 0.100 | 1.533 | 56.0 | Refraction |
| 17 | Second absorptive polarizer | Infinity | 0.100 | 1.533 | 56.0 | Refraction |
| 18 | Image source plane | Infinity | — | — | — | — |

The reference wavelength is 550 nm.

TABLE 22

Embodiment 6
Aspheric Coefficients

| Surface | 1 | 2 | 3 | 4 | 8, 10, 14 | 9, 15 |
|---|---|---|---|---|---|---|
| K: | 0.0000E+00 | 0.0000E+00 | −2.0627E−01 | 0.0000E+00 | 0.0000E+00 | 0.0000E+00 |
| A2: | 0.0000E+00 | 0.0000E+00 | 0.0000E+00 | 0.0000E+00 | 0.0000E+00 | 0.0000E+00 |
| A4: | −1.1715E−05 | −4.0874E−05 | 5.8026E−05 | 6.4153E−05 | 0.0000E+00 | 0.0000E+00 |
| A6: | 3.7663E−11 | −8.0525E−08 | 1.6400E−07 | 1.0691E−07 | 0.0000E+00 | 0.0000E+00 |
| A8: | −7.2412E−10 | 7.0159E−11 | 2.0777E−10 | −1.9260E−10 | 0.0000E+00 | 0.0000E+00 |
| A10: | −7.5971E−12 | 2.4966E−12 | 6.1292E−12 | −8.0932E−13 | 0.0000E+00 | 0.0000E+00 |
| A12: | −1.4095E−14 | 1.8405E−14 | 2.5661E−15 | 7.6759E−16 | 0.0000E+00 | 0.0000E+00 |
| A14: | 4.4519E−16 | −2.5695E−16 | −1.3272E−16 | 1.2401E−17 | 0.0000E+00 | 0.0000E+00 |
| A16: | −3.9216E−18 | 0.0000E+00 | 5.8205E−19 | −1.4243E−20 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 23

Embodiment 6

| f1 [mm] | 32.27 | CA1 [mm] | 11.54 | TDP1 [mm] | 0.10 |
|---|---|---|---|---|---|
| f2 [mm] | −80.09 | CA2 [mm] | 12.96 | TDP2 [mm] | 5.73 |
| f3 [mm] | 126.72 | — | | — | — |

TABLE 24

Embodiment 6

| f1/f | 1.78 | f3/f | 6.99 |
|---|---|---|---|
| R1/R2 | −2.96 | R6/R5 | 0.00 |
| R6/R2 | 3.03 | R6/CT3 | −6.66 |
| CT3/CT2 | 3.84 | (R1*R2)/f1 | −12.20 |
| (CT1 + CT2)/CT3 | 1.06 | CA1/TDP1 | 114.31 |
| R1/CT1 | 8.14 | CA2/TDP2 | 2.26 |
| f3/R1 | 1.87 | (CA2/TL)*R1 | 36.50 |

TABLE 24-continued

Embodiment 6

| f1/f3 | 0.25 | (R2/CT1)(f1/f) | −4.90 |
|---|---|---|---|
| f2/f | −4.41 | — | — |

Seventh Embodiment

Figure 7:
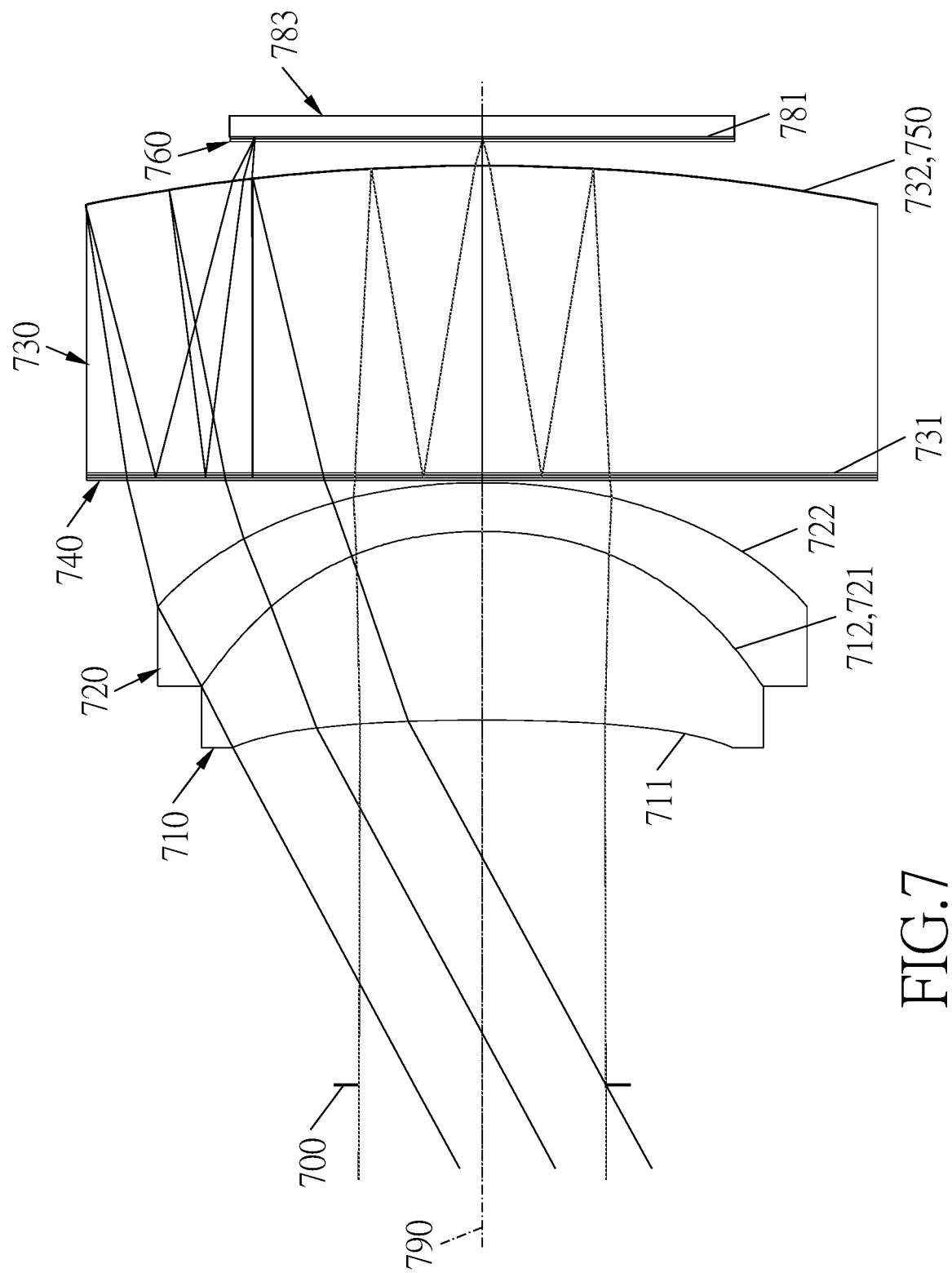
FIG. 7 is a schematic view of an optical lens assembly in accordance with a seventh embodiment of the present invention.

Referring to FIG. 7, an optical lens assembly in accordance with a seventh embodiment of the present invention includes, in order from a visual side to an image source side along an optical axis 790: a stop 700, a first lens 710, a second lens 720, a first optical element group 740, a third lens 730, a partial-reflective-partial-transmissive element 750, a second optical element group 760 and an image source plane 781. The optical lens assembly has a total of three lenses with refractive power, but not is limited thereto.

The stop 700 may be located in a position where the user's eyes view an image.

The first lens 710 with positive refractive power includes a visual-side surface 711 and an image source-side surface 712, the visual-side surface 711 of the first lens 710 is concave in a paraxial region thereof, the image source-side surface 712 of the first lens 710 is convex in a paraxial region thereof, the visual-side surface 711 and the image source-side surface 712 of the first lens 710 are aspheric, and the first lens 710 is made of plastic.

The second lens 720 with negative refractive power includes a visual-side surface 721 and an image source-side surface 722, the visual-side surface 721 of the second lens 720 is concave in a paraxial region thereof, the image source-side surface 722 of the second lens 720 is convex in a paraxial region thereof, the visual-side surface 721 and the image source-side surface 722 of the second lens 720 are aspheric, and the second lens 720 is made of plastic. The second lens 720 and the first lens 710 together form a cemented doublet lens.

The third lens 730 with positive refractive power includes a visual-side surface 731 and an image source-side surface 732, the visual-side surface 731 of the third lens 730 is flat in a paraxial region thereof, the image source-side surface 732 of the third lens 730 is convex in a paraxial region thereof, the image source-side surface 732 of the third lens 730 is spherical, and the third lens 730 is made of plastic.

The first optical element group 740 is disposed on the visual-side surface 731 of the third lens 730 and includes, in order from the visual side to the image source side along the optical axis 790: a first absorptive polarizer, a reflective polarizer and a first phase retarder. The configuration of the first absorptive polarizer, the reflective polarizer and the first phase retarder is the same as that of the first absorptive polarizer 141, the reflective polarizer 142 and the first phase retarder 143 of the first embodiment and will not be explained again.

The partial-reflective-partial-transmissive element 750 is disposed on the image source-side surface 732 of the third lens 730 and has an average reflectance of at least 30%, preferably 50%, in the wavelength range of visible light. The average reflectance here is an average value of different reflectance of the partial-reflective-partial-transmissive element 750 for different wavelengths.

The second optical element group 760 is disposed on the image source plane 781 and includes, in order from the visual side to the image source side along the optical axis 790: a second phase retarder and a second absorptive polarizer. The configuration of the second phase retarder and the second absorptive polarizer is the same as that of the second phase retarder 161 and the second absorptive polarizer 162 of the first embodiment and will not be explained again.

The optical lens assembly works in cooperation with an image source 783 disposed on the image source plane 781. In the present embodiment, the type of the image source 783 is, for example, but not limited to, an OLED display, a LED display, a liquid crystal display, or other displays.

Please refer to Tables 25-28, Table 25 shows the detailed optical data of the elements of the optical lens assembly of the seventh embodiment, Table 26 shows the data of the aspherical surfaces of the lenses of the optical lens assembly of the seventh embodiment, Table 27 shows the remaining parameters of the optical lens assembly of the seventh embodiment and the values thereof, and the values of the parameters in Tables 25 and 27 meet the conditional formulas of Table 28. In the seventh embodiment, the equation of the aspheric surface profiles of the aforementioned lenses is the same as the equation of the aspheric surface profiles of the aforementioned lenses in the first embodiment. The definitions of the surfaces in Table 25 can be referred to the relevant description of Table 1 and will not be explained again.

TABLE 25

Embodiment 7
f = 19.57 mm, EPD(Entrance pupil diameter) = 10.00 mm, FOV (Field of view) = 56.00°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | First lens | −87.167 | 7.762 | 1.544 | 55.9 | Refraction |
| 2 | | −16.051 | 0.000 | — | — | Refraction |
| 3 | Second lens | −16.051 | 2.000 | 1.645 | 23.4 | Refraction |
| 4 | | −23.678 | 0.100 | — | — | Refraction |
| 5 | First absorptive polarizer | Infinity | 0.100 | 1.533 | 56.0 | Refraction |
| 6 | Reflective polarizer | Infinity | 0.100 | 1.533 | 56.0 | Refraction |
| 7 | First phase retarder | Infinity | 0.100 | 1.533 | 56.0 | Refraction |
| 8 | Third lens | Infinity | 12.638 | 1.544 | 55.900 | Refraction |
| 9 | Partial-reflective-partial-transmissive element | −81.316 | −12.638 | — | — | Reflection |
| 10 | First phase retarder | Infinity | −0.100 | 1.533 | 56.0 | Refraction |
| 11 | Reflective polarizer | Infinity | −0.100 | 1.533 | 56.0 | Refraction |
| 12 | Reflective polarizer | Infinity | 0.100 | — | — | Reflection |
| 13 | First phase retarder | Infinity | 0.100 | 1.533 | 56.0 | Refraction |
| 14 | Third lens | Infinity | 12.638 | 1.544 | 55.9 | Refraction |
| 15 | Partial-reflective-partial-transmissive element | −81.316 | 1.000 | — | — | Refraction |
| 16 | Second phase retarder | Infinity | 0.100 | 1.533 | 56.0 | Refraction |
| 17 | Second absorptive polarizer | Infinity | 0.100 | 1.533 | 56.0 | Refraction |
| 18 | Image source plane | Infinity | — | — | — | — |

The reference wavelength is 550 nm.

TABLE 26

Embodiment 7
Aspheric Coefficients

| Surface | 1 | 2 | 3 | 4 | 8, 10, 14 | 9, 15 |
|---|---|---|---|---|---|---|
| K: | 0.0000E+00 | 0.0000E+00 | 0.0000E+00 | 0.0000E+00 | 0.0000E+00 | 0.0000E+00 |
| A2: | 0.0000E+00 | 0.0000E+00 | 0.0000E+00 | 0.0000E+00 | 0.0000E+00 | 0.0000E+00 |
| A4: | −2.3306E−05 | −1.9255E−04 | −1.9255E−04 | −3.5158E−05 | 0.0000E+00 | 0.0000E+00 |
| A6: | −2.6725E−07 | 1.4129E−06 | 1.4129E−06 | 1.2565E−07 | 0.0000E+00 | 0.0000E+00 |
| A8: | 1.9968E−09 | −3.9152E−09 | −3.9152E−09 | −4.6121E−10 | 0.0000E+00 | 0.0000E+00 |
| A10: | −2.3610E−11 | −2.9871E−11 | −2.9871E−11 | −4.1219E−12 | 0.0000E+00 | 0.0000E+00 |
| A12: | −4.9339E−14 | 3.8751E−14 | 3.8751E−14 | 8.8672E−15 | 0.0000E+00 | 0.0000E+00 |
| A14: | 1.9228E−15 | 8.2701E−16 | 8.2701E−16 | 1.0410E−16 | 0.0000E+00 | 0.0000E+00 |
| A16: | −1.1411E−17 | 0.0000E+00 | 0.0000E+00 | −4.7844E−19 | 0.0000E+00 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 27

Embodiment 7

| f1 [mm] | 34.61 | CA1 [mm] | 10.11 | TDP1 [mm] | 1.13 |
|---|---|---|---|---|---|
| f2 [mm] | −85.66 | CA2 [mm] | 11.37 | TDP2 [mm] | 6.37 |
| f3 [mm] | 148.59 | — | | — | — |

TABLE 28

Embodiment 7

| f1/f | 1.77 | f3/f | 7.59 |
|---|---|---|---|
| R1/R2 | 5.43 | R6/R5 | 0.00 |
| R6/R2 | 5.07 | R6/CT3 | −6.43 |
| CT3/CT2 | 6.32 | (R1*R2)/f1 | 9.42 |
| (CT1 + CT2)/CT3 | 0.77 | CA1/TDP1 | 8.94 |
| R1/CT1 | −11.23 | CA2/TDP2 | 1.78 |
| f3/R1 | −1.70 | (CA2/TL)*R1 | −41.28 |
| f1/f3 | 0.23 | (R2/CT1)(f1/f) | −3.66 |
| f2/f | −4.38 | — | — |

Eighth Embodiment

Figure 8:
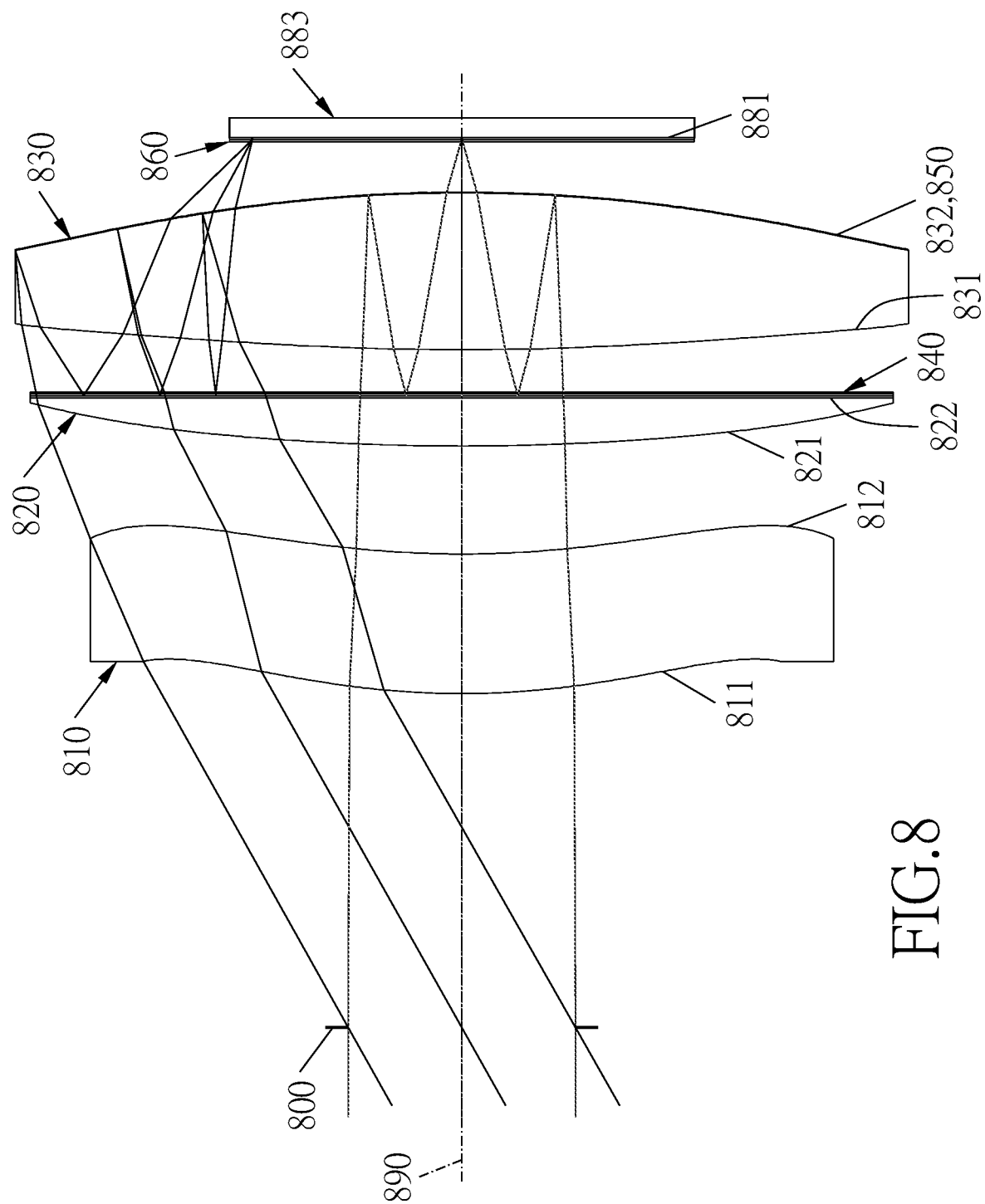
FIG. 8 is a schematic view of an optical lens assembly in accordance with an eighth embodiment of the present invention.

Referring to FIG. 8, an optical lens assembly in accordance with an eighth embodiment of the present invention includes, in order from a visual side to an image source side along an optical axis 890: a stop 800, a first lens 810, a second lens 820, a first optical element group 840, a third lens 830, a partial-reflective-partial-transmissive element 850, a second optical element group 860 and an image source plane 881. The optical lens assembly has a total of three lenses with refractive power, but not is limited thereto.

The stop 800 may be located in a position where the user's eyes view an image.

The first lens 810 with positive refractive power includes a visual-side surface 811 and an image source-side surface 812, the visual-side surface 811 of the first lens 810 is convex in a paraxial region thereof, the image source-side surface 812 of the first lens 810 is concave in a paraxial region thereof, the visual-side surface 811 and the image source-side surface 812 of the first lens 810 are aspheric, and the first lens 810 is made of plastic.

The second lens 820 with positive refractive power includes a visual-side surface 821 and an image source-side surface 822, the visual-side surface 821 of the second lens 820 is convex in a paraxial region thereof, the image source-side surface 822 of the second lens 820 is flat in a paraxial region thereof, the visual-side surface 821 of the second lens 820 is aspheric, and the second lens 820 is made of plastic.

The third lens 830 with positive refractive power includes a visual-side surface 831 and an image source-side surface 832, the visual-side surface 831 of the third lens 830 is convex in a paraxial region thereof, the image source-side surface 832 of the third lens 830 is convex in a paraxial region thereof, the visual-side surface 831 and the image source-side surface 832 of the third lens 830 are aspheric, and the third lens 830 is made of plastic.

The first optical element group 840 is disposed on the image source-side surface 822 of the second lens 820 and includes, in order from the visual side to the image source side along the optical axis 890: a first absorptive polarizer, a reflective polarizer and a first phase retarder. The configuration of the first absorptive polarizer, the reflective polarizer and the first phase retarder is the same as that of the first absorptive polarizer 141, the reflective polarizer 142 and the first phase retarder 143 of the first embodiment and will not be explained again.

The partial-reflective-partial-transmissive element 850 is disposed on the image source-side surface 832 of the third lens 830 and has an average reflectance of at least 30%, preferably 50%, in the wavelength range of visible light. The average reflectance here is an average value of different reflectance of the partial-reflective-partial-transmissive element 850 for different wavelengths.

The second optical element group 860 is disposed on the image source plane 881 and includes, in order from the visual side to the image source side along the optical axis 890: a second phase retarder and a second absorptive polarizer. The configuration of the second phase retarder and the second absorptive polarizer is the same as that of the second phase retarder 161 and the second absorptive polarizer 162 of the first embodiment and will not be explained again.

The optical lens assembly works in cooperation with an image source 883 disposed on the image source plane 881. In the present embodiment, the type of the image source 883 is, for example, but not limited to, an OLED display, a LED display, a liquid crystal display, or other displays.

Please refer to Tables 29-32, Table 29 shows the detailed optical data of the elements of the optical lens assembly of the eighth embodiment, Table 30 shows the data of the aspherical surfaces of the lenses of the optical lens assembly of the eighth embodiment, Table 31 shows the remaining parameters of the optical lens assembly of the eighth embodiment and the values thereof, and the values of the parameters in Tables 29 and 31 meet the conditional formulas of Table 32. In the eighth embodiment, the equation of the aspheric surface profiles of the aforementioned lenses is the same as the equation of the aspheric surface profiles of the aforementioned lenses in the first embodiment. The definitions of the surfaces in Table 29 can be referred to the relevant description of Table 1 and will not be explained again.

TABLE 29

Embodiment 8
f = 18.19 mm, EPD(Entrance pupil diameter) = 10.00 mm, FOV (Field of view) = 57.71°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | First lens | 34.173 | 6.274 | 1.544 | 55.9 | Refraction |
| 2 | | 42.937 | 4.857 | — | — | Refraction |
| 3 | Second lens | 110.714 | 2.135 | 1.544 | 55.9 | Refraction |
| 4 | First absorptive polarizer | Infinity | 0.100 | 1.533 | 56.0 | Refraction |
| 5 | Reflective polarizer | Infinity | 0.100 | 1.533 | 56.0 | Refraction |
| 6 | First phase retarder | Infinity | 0.100 | 1.533 | 56.0 | Refraction |
| 7 | | Infinity | 1.890 | — | — | Refraction |
| 8 | Third lens | 129.300 | 7.063 | 1.544 | 55.900 | Refraction |
| 9 | Partial-reflective-partial-transmissive element | −68.753 | −7.063 | — | — | Reflection |
| 10 | | 129.300 | −1.890 | — | — | Refraction |
| 11 | First phase retarder | Infinity | −0.100 | 1.533 | 56.0 | Refraction |
| 12 | Reflective polarizer | Infinity | −0.100 | 1.533 | 56.0 | Refraction |
| 13 | Reflective polarizer | Infinity | 0.100 | — | — | Reflection |
| 14 | First phase retarder | Infinity | 0.100 | 1.533 | 56.0 | Refraction |
| 15 | | Infinity | 1.890 | — | — | Refraction |
| 16 | Third lens | 129.300 | 7.063 | 1.544 | 55.9 | Refraction |
| 17 | Partial-reflective-partial-transmissive element | −68.753 | 2.280 | — | — | Refraction |
| 18 | Second phase retarder | Infinity | 0.100 | 1.533 | 56.0 | Refraction |
| 19 | Second absorptive polarizer | Infinity | 0.100 | 1.533 | 56.0 | Refraction |
| 20 | Image source plane | Infinity | — | — | — | — |

The reference wavelength is 550 nm.

TABLE 30

Embodiment 8
Aspheric Coefficients

| Surface | 1 | 2 | 3 | 4 | 8, 10, 16 | 9, 17 |
|---|---|---|---|---|---|---|
| K:   | −5.3525E+00 | −7.5221E+00 | −1.7631E+01 | 0.0000E+00 | −3.0407E+01 | −1.1050E+00 |
| A2:  | 0.0000E+00  | 0.0000E+00  | 0.0000E+00  | 0.0000E+00 | 0.0000E+00  | 0.0000E+00  |
| A4:  | −6.9119E−06 | −7.6849E−06 | −7.9976E−08 | 0.0000E+00 | −1.4962E−06 | 3.5987E−07  |
| A6:  | −4.9302E−08 | −2.7343E−08 | 1.1354E−08  | 0.0000E+00 | −8.2575E−10 | 1.0984E−09  |
| A8:  | −8.7928E−11 | −1.0237E−10 | 9.2473E−12  | 0.0000E+00 | −7.7597E−14 | 2.3102E−12  |
| A10: | −6.0233E−13 | −2.3540E−13 | −1.2075E−14 | 0.0000E+00 | 4.5237E−15  | 1.7381E−15  |
| A12: | −1.6016E−15 | −2.0726E−17 | −5.7442E−17 | 0.0000E+00 | −1.8839E−18 | 2.8049E−18  |
| A14: | 1.8562E−17  | 1.6676E−18  | −1.3546E−19 | 0.0000E+00 | −4.6076E−20 | 1.3546E−20  |
| A16: | −8.8664E−20 | −4.9534E−21 | 3.1761E−22  | 0.0000E+00 | 3.2783E−22  | 2.7089E−23  |
| A18: | 0.0000E+00  | 0.0000E+00  | 0.0000E+00  | 0.0000E+00 | 0.0000E+00  | 0.0000E+00  |
| A20: | 0.0000E+00  | 0.0000E+00  | 0.0000E+00  | 0.0000E+00 | 0.0000E+00  | 0.0000E+00  |

TABLE 31

Embodiment 8

| f1 [mm] | 244.11 | CA1 [mm] | 14.03 | TDP1 [mm] | 1.45 |
|---|---|---|---|---|---|
| f2 [mm] | 202.30 | CA2 [mm] | 16.37 | TDP2 [mm] | 0.70 |
| f3 [mm] | 83.06 | — | — | — | — |

TABLE 32

Embodiment 8

| f1/f | 13.42 | f3/f | 4.57 |
|---|---|---|---|
| R1/R2 | 0.80 | R6/R5 | 0.00 |

TABLE 32-continued

Embodiment 8

| R6/R2 | −1.60 | R6/CT3 | −9.73 |
|---|---|---|---|
| CT3/CT2 | 3.31 | (R1*R2)/f1 | 17.66 |
| (CT1 + CT2)/CT3 | 1.19 | CA1/TDP1 | 9.67 |
| R1/CT1 | 5.45 | CA2/TDP2 | 23.46 |
| f3/R1 | 2.43 | (CA2/TL)*R1 | 22.38 |
| f1/f3 | 2.94 | (R2/CT1)(f1/f) | 91.85 |
| f2/f | 11.12 | — | — |

For the optical lens assembly in the present invention, the lenses can be made of plastic or glass. If the lens is made of plastic, it is conducive to reducing the manufacturing cost.

If the lens is made of glass, it is conducive to enhancing the degree of freedom in the arrangement of refractive power of the optical lens assembly.

For the optical lens assembly in the present invention, the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

For the optical lens assembly in the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

For the optical lens assembly in the present invention, the maximum effective radius of the lens surface is usually a radius of the effective optical region of the lens surface (i.e., a region which is not subjected to any surface treatment or extinction processing or is not provided with any shade).

Figure 9:
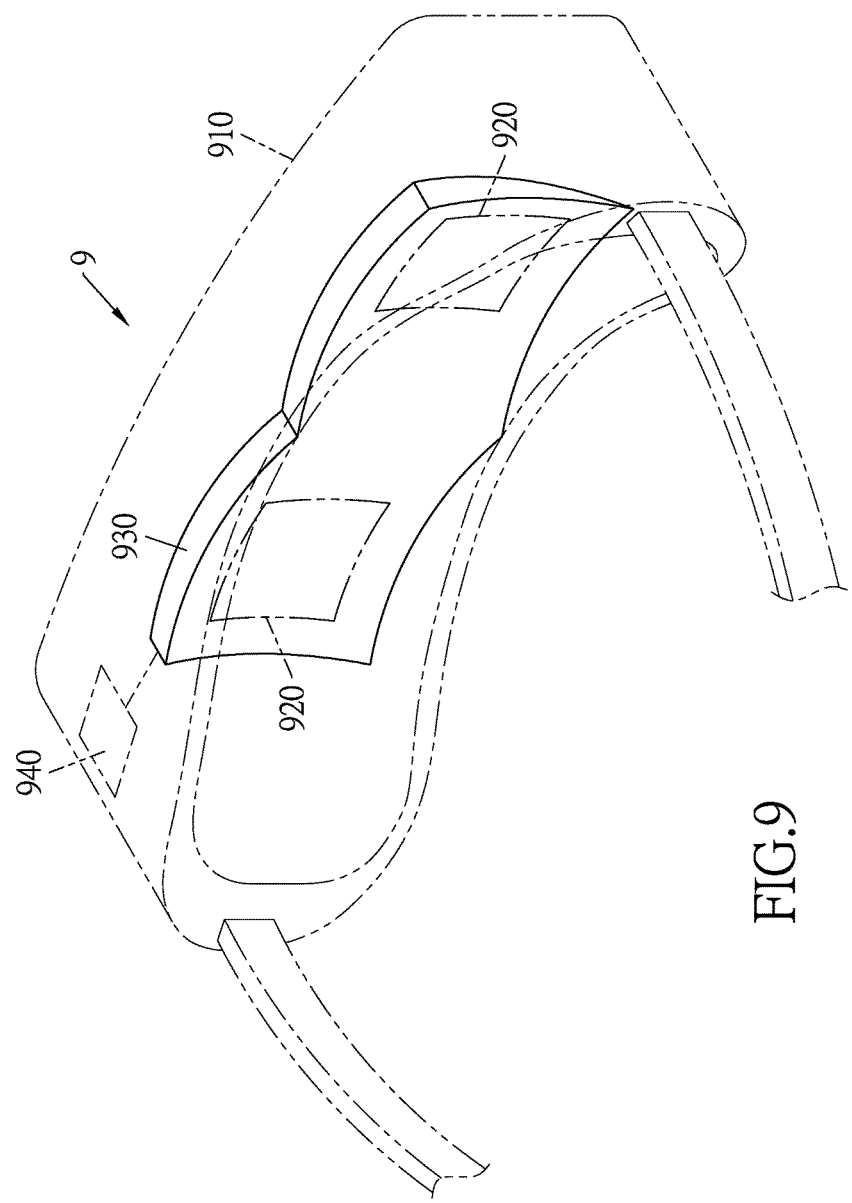
FIG. 9 is a schematic diagram of a head-mounted electronic device in accordance with an embodiment of the present invention.

The optical lens assembly of the present invention can be used in head-mounted electronic devices as required. FIG. 9 shows a head-mounted electronic device in accordance with an embodiment of the present invention. The head-mounted electronic device 9 is a head-mounted display device using, but not limited to, virtual reality (VR) technology, and includes a housing 910, an optical module 920, an image source 930 and a controller 940.

The optical module 920 corresponds to the left and right eyes of the user. The optical module 920 includes an optical lens assembly described in any one of the first to eighth embodiments.

The image source 930 can be an image source described in any one of the first to eighth embodiments. The image source 930 corresponds to the left and right eyes of the user, and the type of the image source 930 may be an OLED display, a LED display, a liquid crystal display, or other display, but is not limited thereto.

The controller 940 is electrically connected to the image source 930, so as to control the image source 930 to display an image, whereby the head-mounted electronic device 9 can project the image to the eyes of the user.

What is claimed is:

1. An optical lens assembly, comprising:
   an optical element group; and
   in order from a visual side to an image source side: a first lens with positive refractive power, a second lens with refractive power, a third lens with refractive power, and an image source-side surface of the third lens being convex in a paraxial region thereof, and a partial-reflective-partial-transmissive element;
   wherein the optical element group is disposed between the first lens and the third lens, and includes, in order from the visual side to the image source side: an absorptive polarizer, a reflective polarizer and a phase retarder, a radius of curvature of an image source-side surface of the first lens is R2, a thickness of the first lens along an optical axis is CT1, a focal length of the first lens is f1, a focal length of the optical lens assembly is f, and the following condition is satisfied: $-5.88<(R2/CT1)*(f1/f)<110.22$.

2. The optical lens assembly as claimed in claim 1, wherein a focal length of the third lens is f3, the focal length of the optical lens assembly is f, and the following condition is satisfied: $-6.92<f3/f<23.80$.

3. The optical lens assembly as claimed in claim 1, wherein a focal length of the third lens is f3, a radius of curvature of a visual-side surface of the first lens is R1, and the following condition is satisfied: $-5.58<f3/R1<27.18$.

4. The optical lens assembly as claimed in claim 1, wherein a maximum effective radius of a visual-side surface of the first lens is CA1, an absolute value of a displacement in parallel to the optical axis from an intersection between the visual-side surface of the first lens and the optical axis to the maximum effective radius position on the visual-side surface of the first lens is TDP1, and the following condition is satisfied: $1.76<CA1/TDP1<137.17$.

5. The optical lens assembly as claimed in claim 1, wherein a maximum effective radius of the image source-side surface of the first lens is CA2, an absolute value of a displacement in parallel to the optical axis from an intersection between the image source-side surface of the first lens and the optical axis to the maximum effective radius position on the image source-side surface of the first lens is TDP2, and the following condition is satisfied: $1.43<CA2/TDP2<56.16$.

6. The optical lens assembly as claimed in claim 1, wherein a radius of curvature of the image source-side surface of the third lens is R6, a thickness of the third lens along the optical axis is CT3, and the following condition is satisfied: $-58.44<R6/CT3<-5.15$.

7. The optical lens assembly as claimed in claim 1, wherein a radius of curvature of a visual-side surface of the first lens is R1, the radius of curvature of the image source-side surface of the first lens is R2, the focal length of the first lens is f1, and the following condition is satisfied: $-32.71 \text{ mm}<(R1*R2)/f1<60.84 \text{ mm}$.

8. The optical lens assembly as claimed in claim 1, wherein a radius of curvature of a visual-side surface of the first lens is R1, the radius of curvature of the image source-side surface of the first lens is R2, and the following condition is satisfied: $-3.55<R1/R2<6.52$.

9. The optical lens assembly as claimed in claim 1, wherein a radius of curvature of the image source-side surface of the third lens is R6, the radius of curvature of the image source-side surface of the first lens is R2, and the following condition is satisfied: $-4.59<R6/R2<6.08$.

10. The optical lens assembly as claimed in claim 1, wherein a thickness of the second lens along the optical axis is CT2, a thickness of the third lens along the optical axis is CT3, and the following condition is satisfied: $0.22<CT3/CT2<7.58$.

11. The optical lens assembly as claimed in claim 1, wherein the thickness of the first lens along the optical axis is CT1, a thickness of the second lens along the optical axis is CT2, a thickness of the third lens along the optical axis is CT3, and the following condition is satisfied: $0.62<(CT1+CT2)/CT3<8.67$.

12. The optical lens assembly as claimed in claim 1, wherein a radius of curvature of a visual-side surface of the first lens is R1, the thickness of the first lens along an optical axis is CT1, and the following condition is satisfied: $-13.48<R1/CT1<9.76$.

13. The optical lens assembly as claimed in claim 1, wherein the focal length of the first lens is f1, the focal length of the optical lens assembly is f, and the following condition is satisfied: 1.42<f1/f<16.1.

14. The optical lens assembly as claimed in claim 1, wherein a maximum effective radius of the image source-side surface of the first lens is CA2, a distance from a visual-side surface of the first lens to an image source plane along the optical axis is TL, a radius of curvature of the visual-side surface of the first lens is R1, and the following condition is satisfied: −49.53 mm<(CA2/TL)*R1<43.8 mm.

15. A head-mounted electronic device, comprising:
a housing;
an optical lens assembly disposed in the housing;
an image source disposed on an image source plane of the optical lens assembly in the housing; and
a controller disposed in the housing and electrically connected to the image source;
wherein the optical lens assembly comprising:
an optical element group; and
in order from a visual side to an image source side: a first lens with positive refractive power, a second lens with refractive power, a third lens with refractive power, and an image source-side surface of the third lens being convex in a paraxial region thereof, and a partial-reflective-partial-transmissive element;
wherein the optical element group is disposed between the first lens and the third lens, and includes, in order from the visual side to the image source side: an absorptive polarizer, a reflective polarizer and a phase retarder, a radius of curvature of an image source-side surface of the first lens is R2, a thickness of the first lens along an optical axis is CT1, a focal length of the first lens is f1, a focal length of the optical lens assembly is f, and the following condition is satisfied: −5.88<(R2/CT1)*(f1/f)<110.22.

16. The head-mounted electronic device as claimed in claim 15, wherein a focal length of the third lens is f3, the focal length of the optical lens assembly is f, and the following condition is satisfied: −6.92<f3/f<23.80.

17. The head-mounted electronic device as claimed in claim 15, wherein a maximum effective radius of a visual-side surface of the first lens is CA1, an absolute value of a displacement in parallel to the optical axis from an intersection between the visual-side surface of the first lens and the optical axis to the maximum effective radius position on the visual-side surface of the first lens is TDP1, and the following condition is satisfied: 1.76<CA1/TDP1<137.17.

18. The head-mounted electronic device as claimed in claim 15, wherein a radius of curvature of a visual-side surface of the first lens is R1, the radius of curvature of the image source-side surface of the first lens is R2, the focal length of the first lens is f1, and the following condition is satisfied: −32.71 mm<(R1*R2)/f1<60.84 mm.

19. The head-mounted electronic device as claimed in claim 15, wherein the thickness of the first lens along the optical axis is CT1, a thickness of the second lens along the optical axis is CT2, a thickness of the third lens along the optical axis is CT3, and the following condition is satisfied: 0.62<(CT1+CT2)/CT3<8.67.

20. The head-mounted electronic device as claimed in claim 15, wherein a maximum effective radius of the image source-side surface of the first lens is CA2, a distance from a visual-side surface of the first lens to the image source plane along the optical axis is TL, a radius of curvature of the visual-side surface of the first lens is R1, and the following condition is satisfied: −49.53 mm<(CA2/TL)*R1<43.8 mm.

* * * * *